United States Patent
Jeon et al.

(10) Patent No.: US 9,473,605 B2
(45) Date of Patent: Oct. 18, 2016

(54) APPARATUS, METHOD AND COMPUTER READABLE RECORDING MEDIUM FOR DISPLAYING STATUS OF ELECTRONIC DEVICE

(71) Applicant: Samsung Electronics Co., Ltd., Gyeonggi-do (KR)

(72) Inventors: Seong-Joon Jeon, Gyeonggi-do (KR); Joon-Jae Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 14/473,999

(22) Filed: Aug. 29, 2014

(65) Prior Publication Data

US 2015/0061881 A1    Mar. 5, 2015

(30) Foreign Application Priority Data

Aug. 29, 2013   (KR) .................. 10-2013-0103098

(51) Int. Cl.
  *G08B 5/00*    (2006.01)
  *H04M 1/04*    (2006.01)
  *H04M 1/02*    (2006.01)
  *H04M 1/22*    (2006.01)

(52) U.S. Cl.
  CPC ............. *H04M 1/04* (2013.01); *H04M 1/0245* (2013.01); *H04M 1/0214* (2013.01); *H04M 1/22* (2013.01)

(58) Field of Classification Search
  CPC ........... H04M 1/0245; H04M 1/0214; H04M 1/0266; H04M 1/22; H04M 2250/12; H04B 1/3827; H04B 1/3833; G08B 21/18; G08B 5/00; B60R 2001/1215
  USPC ......... 340/539.11, 687, 457, 815.4; 455/348, 455/556, 556.1, 575.3, 351
  See application file for complete search history.

(56) References Cited

U.S. PATENT DOCUMENTS

| | | | |
|---|---|---|---|
| 5,710,576 A * | 1/1998 | Nishiyama ........... | G08B 3/1058 345/169 |
| 8,395,518 B2 * | 3/2013 | Toba ....................... | H04M 1/73 307/10.7 |
| 2004/0198458 A1 * | 10/2004 | Kawamura ......... | H04M 1/0245 455/566 |
| 2004/0204064 A1 * | 10/2004 | Ikeda .................. | H04M 1/0218 455/556.1 |
| 2005/0250562 A1 * | 11/2005 | Carroll ................ | H04M 1/0214 455/575.3 |
| 2008/0125076 A1 * | 5/2008 | Suzuki .................. | H04M 1/22 455/351 |
| 2011/0124362 A1 * | 5/2011 | Wakasa ................ | G06F 3/16 455/511 |
| 2011/0165916 A1 * | 7/2011 | Park ....................... | H01Q 1/06 455/566 |
| 2012/0322518 A1 | 12/2012 | Kim | |
| 2013/0012264 A1 * | 1/2013 | Mitsunaga ............. | G01C 21/20 455/556.1 |
| 2013/0165190 A1 | 6/2013 | Ko et al. | |

FOREIGN PATENT DOCUMENTS

| | | |
|---|---|---|
| KR | 10-2012-0138429 | 12/2012 |
| KR | 10-2013-0074740 | 7/2013 |

* cited by examiner

*Primary Examiner* — Hung T Nguyen

(57) ABSTRACT

A method for displaying a status of an electronic device having a cover attached thereto. The cover has a screen window formed on a part of the cover. The method includes determining whether the cover is open or closed; checking an operation of a status indicator while the cover is closed; and displaying information corresponding to the operation of the status indicator in at least a part of a screen area that is exposed through the screen window.

26 Claims, 14 Drawing Sheets

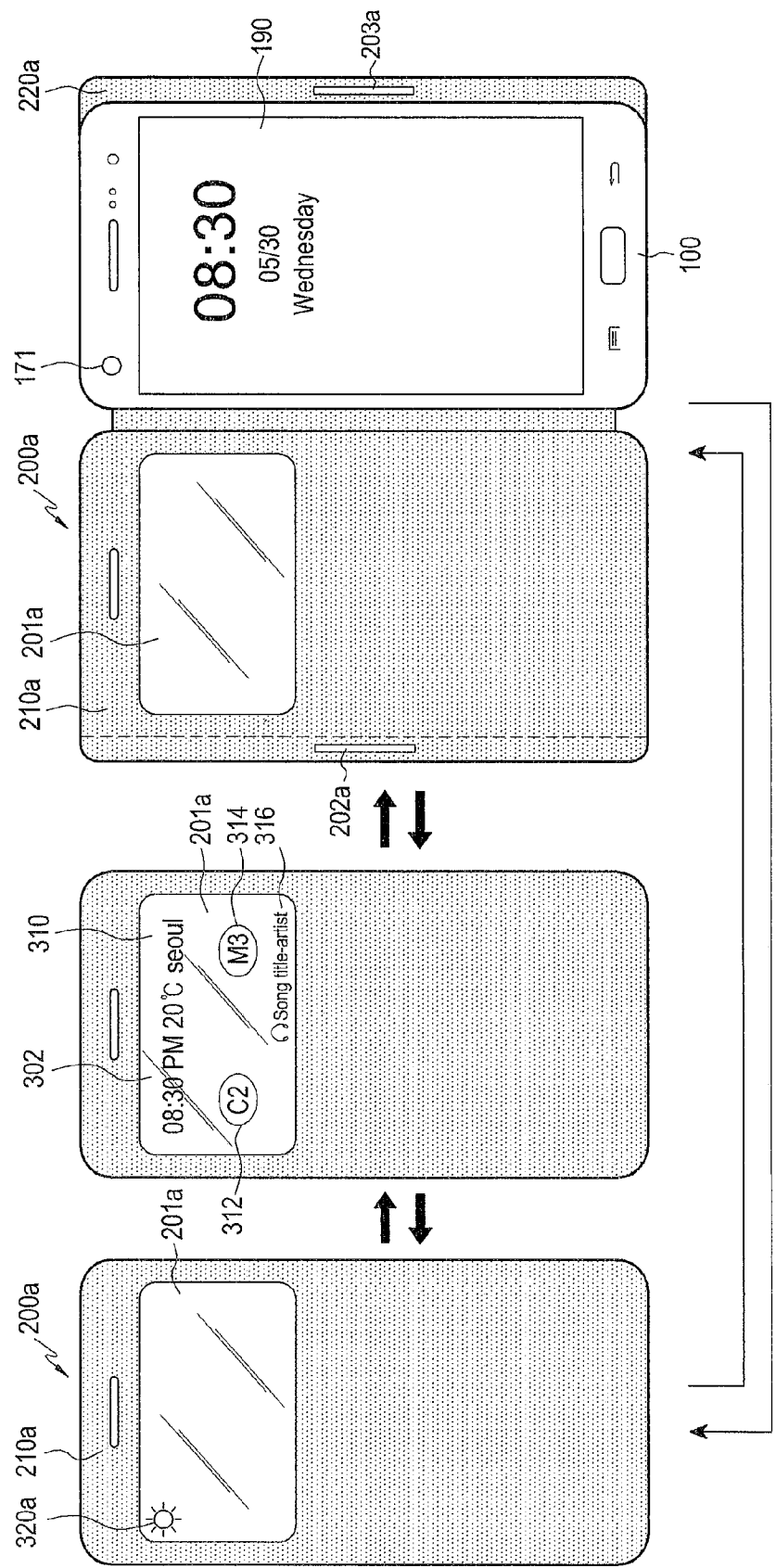

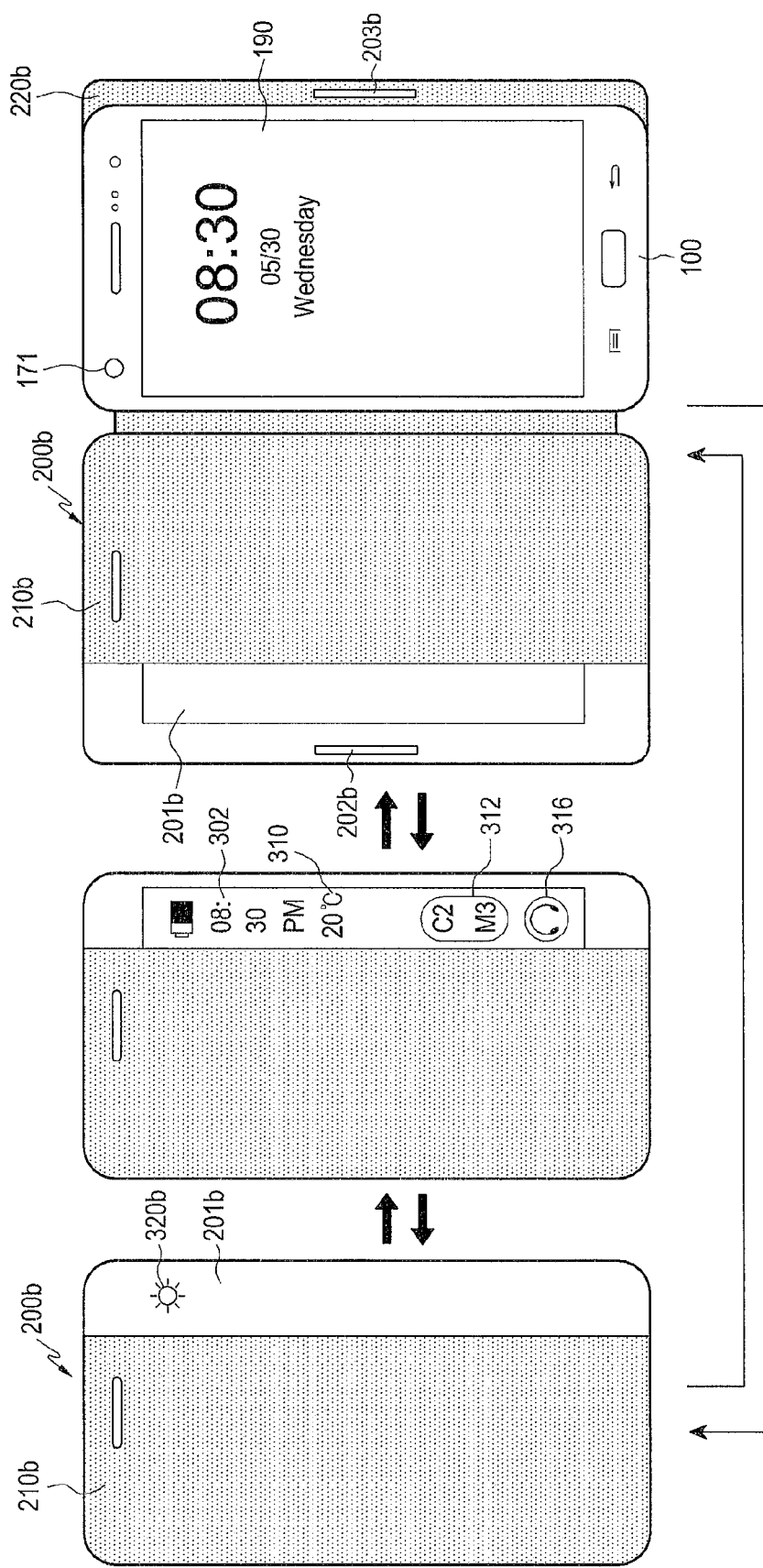

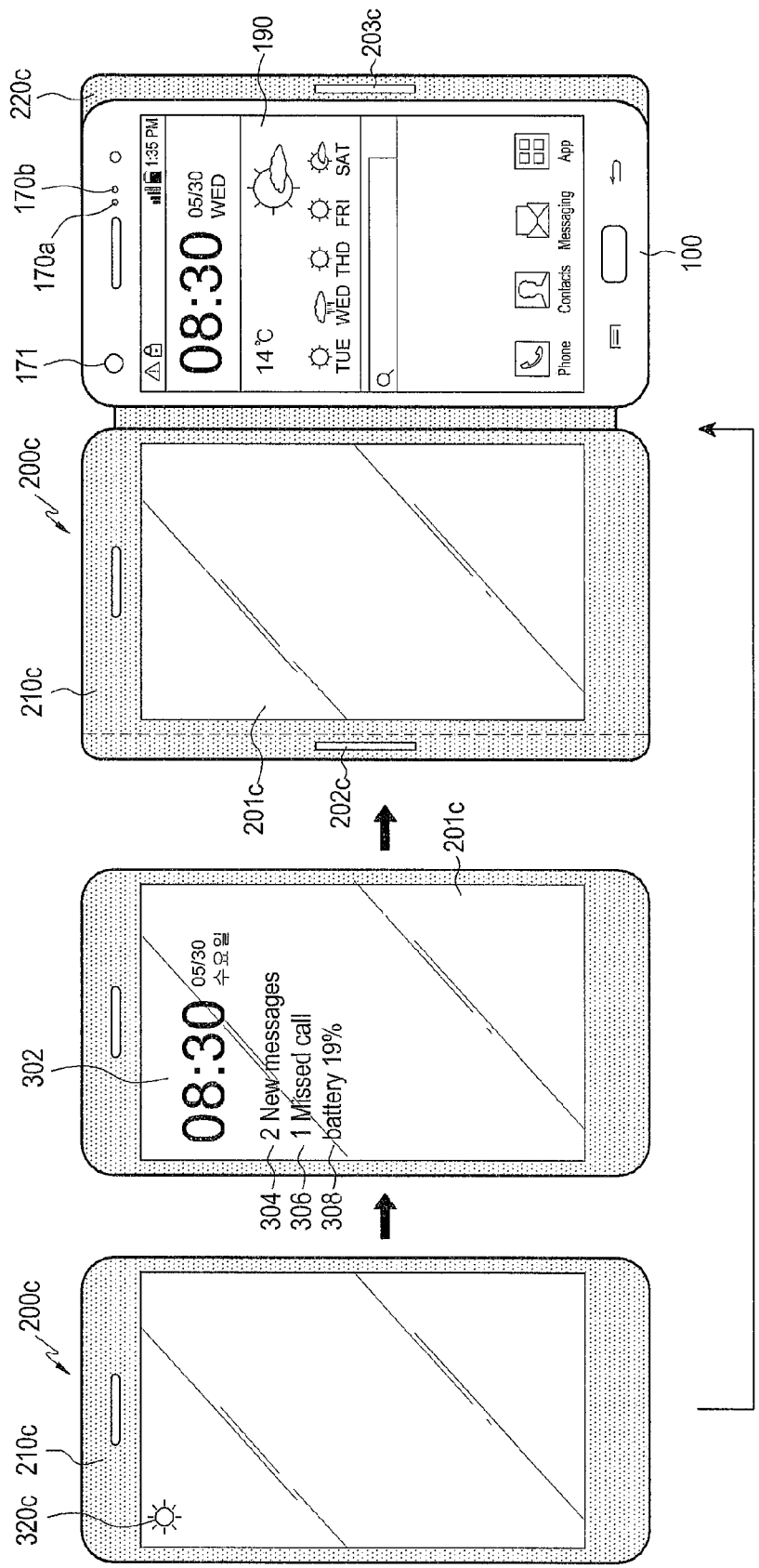

APPARATUS, METHOD AND COMPUTER READABLE RECORDING MEDIUM FOR DISPLAYING STATUS OF ELECTRONIC DEVICE

CROSS-REFERENCE TO RELATED APPLICATION(S) AND CLAIM OF PRIORITY

The present application is related to and claims the benefit under 35 U.S.C. §119(a) of a Korean patent application filed on Aug. 29, 2013 in the Korean Intellectual Property Office and assigned Serial No. 10-2013-0103098, the entire disclosure of which is incorporated hereby incorporated by reference.

TECHNICAL FIELD

The present disclosure relates to an apparatus, method, and computer-readable recording medium for displaying status information in an electronic device.

BACKGROUND

Various electronic devices being used recently have been developed to have various functionalities, such as radio communication, camera, music play, video play, multimedia play, gaming etc. The electronic devices have display units arranged on their front to efficiently use such various functions. For example, for modern smartphones, touch-sensitive displays (e.g., touch screens) are arranged on the front.

To protect electronic devices, especially portable electronic devices against scratches or external shocks while being carried or used, or to provide an aesthetic effect, many different phone cases or covers are provided.

Among the various covers, a cover, such as a flip cover that is closed over the display unit, the user needs to open the cover whenever to check or use the display unit. To supplement this shortcoming, a cover with a transparent or translucent screen window has been designed and used. With the cover having such screen window, the user may perform simple operations (e.g., receiving calls, checking out messages, etc.) or check simple information without opening the cover.

However, the remaining part of the display cannot be seen while the cover is closed over the display unit because the other part of the cover than the transparent or translucent screen window is formed of an opaque material. While the cover is closed over the electronic device, a Light Emitting Diode (LED) indicator which is typically located in a front corner of the electronic device is hidden by the cover. Accordingly, the user cannot check the LED indicator while the cover is closed over the electronic device. Furthermore, despite that the LED indicator cannot be checked by the user while the cover is closed, the LED indicator continues to operate, thus leading to unnecessary power consumption.

SUMMARY

To address the above-discussed deficiencies, the present disclosure may provide an apparatus, method, and computer-readable recording medium for displaying a status of an electronic device by displaying information corresponding to the operation of a status indicator through a screen window formed on a cover attached to the electronic device while the cover is closed.

The present disclosure may provide an apparatus, method, and computer-readable recording medium for displaying a status of an electronic device by controlling information corresponding to the operation of a status indicator to be persistently or periodically displayed through a screen window formed on a cover attached to the electronic device and controlling the status indicator to be turned off.

The present disclosure may also provide an apparatus, method, and computer-readable recording medium for displaying a status of an electronic device by periodically displaying information corresponding to the operation of a status indicator through a screen window formed on a cover attached to the electronic device even if the screen displayed through the screen window is turned off.

In accordance with an aspect of the present disclosure, provided is a method for displaying a status of an electronic device having a cover attached thereto, wherein the cover has a screen window formed on a part of the cover, the method including: determining whether the cover is open or closed; checking an operation of a status indicator while the cover is closed; and displaying information corresponding to the operation of the status indicator in at least a part of a screen area that is exposed through the screen window.

In accordance with another aspect of the present disclosure, provided is a method for displaying a status of an electronic device having a cover attached thereto, wherein the cover has a screen window formed on a part of the cover, the method including: determining whether the cover is open or closed; checking status information of the electronic device while the cover is closed; and displaying information corresponding to the status information of the electronic device in a lighting color, lighting pattern, or a combination of the lighting color and lighting pattern in at least a part of a screen area of the display unit, the screen area being exposed through the screen window.

In accordance with another aspect of the present disclosure, provided is an apparatus for displaying a status of an electronic device, the apparatus including: a display unit that displays a screen; a status indicator that performs a predetermined operation depending on a status of the electronic device; and a controller that determines whether a cover having a screen window formed in a part of the cover is open or closed; and controls information corresponding to the operation of the status indicator to be displayed in at least a part of a screen area of the display unit, the screen area being exposed through the screen window.

In accordance with another aspect of the present disclosure, provided is an apparatus for displaying a status of an electronic device, the apparatus including: a display unit that displays a screen; and a controller that determines whether the cover is open or closed; checks status information of the electronic device while the cover is closed; and displays information corresponding to the status information of the electronic device in a lighting color, lighting pattern, or a combination of the lighting color and lighting pattern in at least a part of a screen area of the display unit, the screen area being exposed through the screen window Information about the method for displaying a status of an electronic device may be stored in a computer-readable recording medium.

The computer-readable recording medium includes any kind of recording medium having a computer-readable program and data embodied thereon. The computer-readable recording medium is any data storage device that can store data which can be thereafter read by a computer system. Examples of the computer readable recording medium include Read-Only Memory (ROM), Random Access Memory (RAM), Compact Disc (CD)-ROMs, magnetic tapes, floppy disks, optical data storage devices, etc. The computer readable recording medium can also be distributed over network coupled computer systems so that the computer readable code is stored and executed in a distributed fashion. The computer readable recording medium can also be distributed over network coupled computer systems so that the computer readable code is stored and executed in a distributed fashion.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A to 7C illustrate displaying a screen in an electronic device having a cover attached thereto, according to an embodiment of the present disclosure;

FIGS. 8A to 8C illustrate displaying a screen in an electronic device having a cover attached thereto, according to another embodiment of the present disclosure;

FIGS. 9A to 9C illustrates screen displays of an electronic device having a cover attached thereto, according to another embodiment of the present disclosure.

Throughout the drawings, like reference numerals will be understood to refer to like parts, components, and structures.

DETAILED DESCRIPTION

Figure 1A:
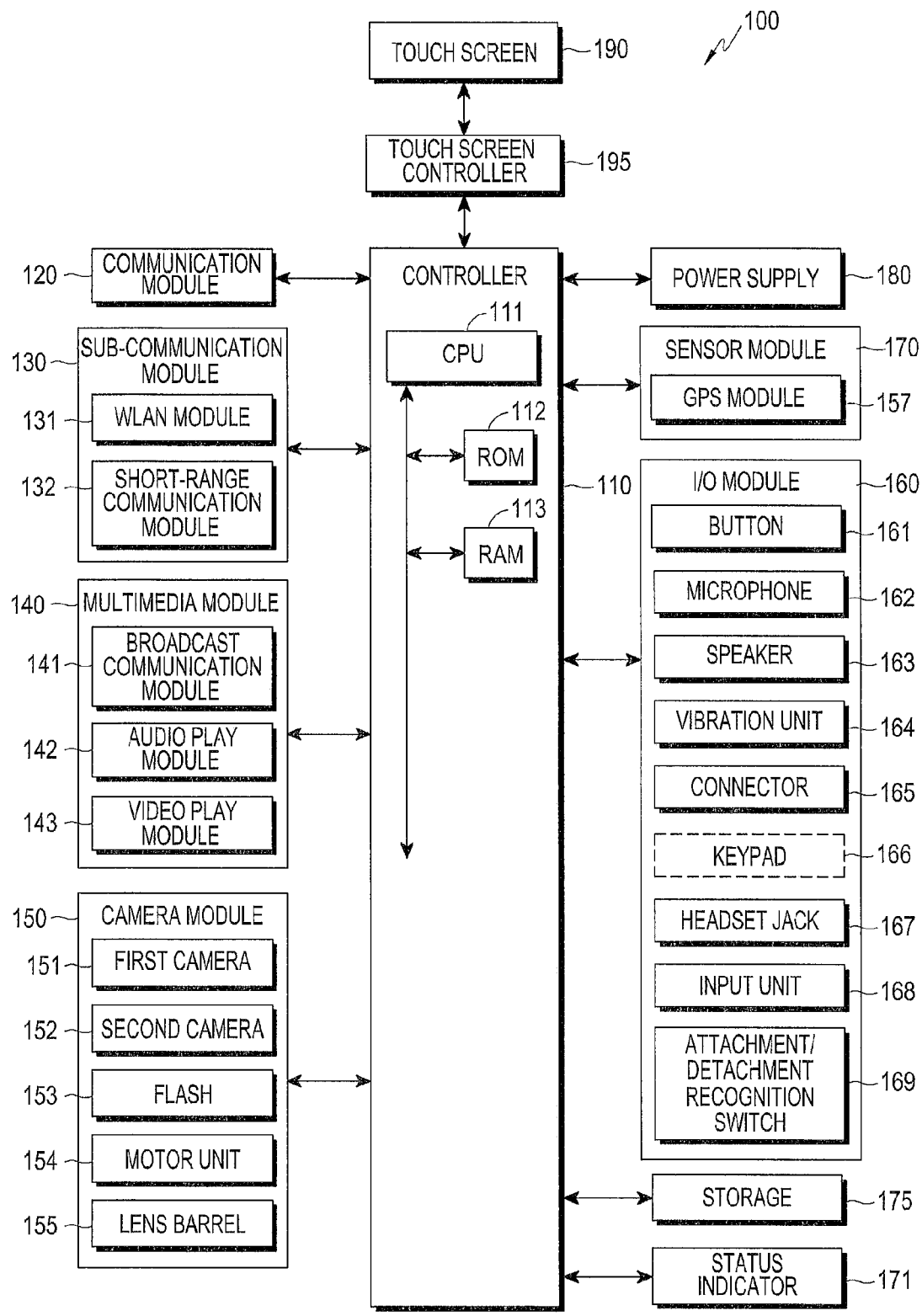
FIG. 1A illustrates a schematic block diagram of an electronic device, according to an embodiment of the present disclosure.

The disclosure now will be described more fully hereinafter with reference to the accompanying drawings, in which illustrative embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~and/or~," or the like.

The terminology used herein is for the purpose of describing particular embodiments only and is not intended to be limiting of the disclosure.

It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present disclosure provide an apparatus, method, and computer-readable recording medium for displaying a status of an electronic device by displaying information corresponding to the operation of a status indicator through a screen window formed on a cover attached to the electronic device while the cover is closed.

If the status indicator of the electronic device may be hidden behind the cover while the cover is closed, the status indicator may be controlled not to be activated but to be in an off state, according to the embodiment of the present disclosure.

Accordingly, with the cover closed, status information of the electronic device that may be indicated by the status indicator may be provided in various forms within a particular display area that may be seen through the transparent screen window.

Meanwhile, embodiments of the present disclosure may be applied not only to electronic devices that have the status indicator but also to electronic devices not equipped with the status indicator. For example, even without the status indicator, the electronic device may provide various status information through a screen window formed on a cover attached to the electronic device while the cover is closed.

In addition, according to the embodiments of the present disclosure, the status information of an electronic device may be persistently or periodically provided through the screen window formed on a cover attached to the electronic device while the cover is closed. Accordingly, for example, when a cover attached to an electronic device is closed, after predetermined information (e.g., time, weather, running application, etc.) has been displayed through a screen window formed on the cover for a predetermined time and is then turned off, status information (e.g., information about battery charging, unread messages or unanswered calls, voice recording status, etc.) corresponding to operations of the status indicator may be displayed periodically or persistently in various forms (e.g., in various colors or text, flickering patterns, etc.) through the screen window.

In the following description, the term 'status indicator' refers to a means equipped in the electronic device separately from the display unit that displays various screens on the front surface of the electronic device, for displaying status information of the electronic device in a predetermined way by means of different lighting colors, patterns, or combinations thereof. For example, in an electronic device, such as a smartphone, the status indicator may be, but not exclusively, termed as a "Light Emitting Diode (LED) indicator". Any means included separately from a main display unit of the electronic device, for displaying the status of the electronic device may be referred to as the status indicator.

Also, in the following description, the term 'screen window' refers to a transparent or translucent window formed on a cover (or a case having the cover) attached to the electronic device, through which at least a part of the display unit of the electronic device is exposed. The screen window may be implemented by forming an opening in the cover or implemented with a transparent or translucent material.

In addition, the term 'cover' refers to a unit attached to the electronic device for covering at least a part of the electronic device, which may be implemented to be integrated in the electronic device or may be implemented to be detachably attached to the electronic device. In various embodiments of the present disclosure, the cover is implemented to cover the whole or a part of the display unit of the electronic device, and may enable a part of the display unit to be displayed through the screen window formed on the cover.

The term 'cover' may be interchangeably used with the 'case' or may refer to a part of the case. Embodiments of the present disclosure are not limited to a particular form of the cover, but may be applied to any types of covers.

The electronic device may be any device that includes a display unit and may be also referred to as a camera, a portable terminal, a communication terminal, a portable communication terminal, a portable mobile terminal, etc. For example, the electronic device may be a digital camera, a smartphone, a cell phone, a game console, a television, a display device, a head unit for vehicle, a notebook computer, a laptop computer, a tablet computer, a Personal Media Player (PMP), a Personal Digital Assistant (PDA), a GPS, a bank Automatic Teller Machine (ATM), a shop Point of Sale (POS), etc. The electronic device may also be a flexible device or a flexible display device.

Figure 1B:
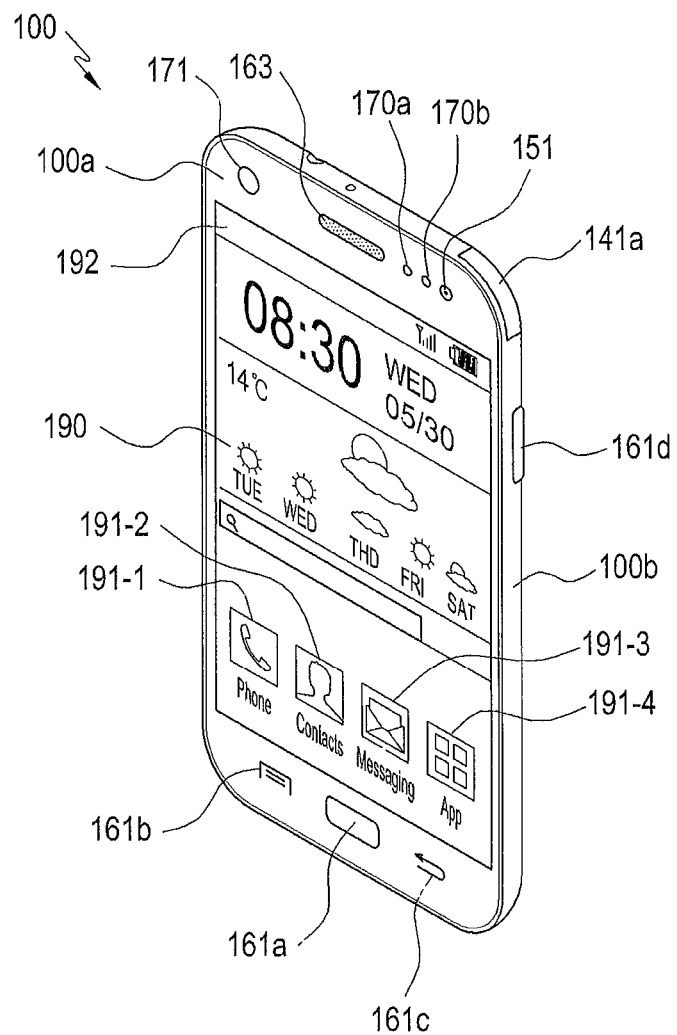
FIG. 1B illustrates a frontal view of an electronic device, according to an embodiment of the present disclosure.

In some embodiments of the present disclosure, the electronic device may be illustrated as a portable device such as a cell phone, smartphone, etc., and some components of the electronic device as will be described below may be omitted or replaced, as necessary. Referring to FIGS. 1A and 1B, a detailed structure of the electronic device that various embodiments of the present disclosure may be applicable will be described first.

FIG. 1A illustrates a schematic block diagram of an electronic device, according to an embodiment of the present disclosure.

Referring to FIG. 1A, the electronic device 100 may include one or more of a controller 110, a communication module 120, a multimedia module 140, a camera module 150, an input/output module 160, a sensor module 170, a status indicator 171, a storage 175, a power supply 180, a touch screen 190, and the touch screen controller 195.

More specifically, the electronic device 100 may be connected to an external electronic device (not shown) by using at least one of the communication module 120, a connector 165, and a headset jack 167. The electronic device 100 may also be connected to one of any other portable devices or electronic devices, such as cell phones, smartphones, tablet Personal Computers (PCs), desktop PCs and servers, wirelessly or via cable.

The communication module 120 may include a mobile communication module 121, a sub-communication module 130, and a broadcast communication module 141. The sub-communication module 130 may include at least one of a Wideband Local Area Network (WLAN) module 131 and a short-range communication module 132. The multimedia module 140 may include at least one of an audio play module 142, or a video play module 143. The camera module 150 may include at least one of a first camera 151 or a second camera 152. The camera module 150 may further include a flash 153, a motor unit 154, and a lens barrel 155. The input/output module 160 may include at least one of a plurality of buttons 161, a microphone 162, a speaker 163, a vibration device 164, the connector 165, and a keypad 166.

The controller 110 may include a Central Processing Unit (CPU) 111, a Read Only Memory (ROM) 112 for storing a control program to control the electronic device 100, and a Random Access Memory (RAM) 113 for storing signals or data input from an outside or for being used as a memory space for working results in the electronic device 100. The CPU 111 may include a single core, dual cores, triple cores, or quad cores. The CPU 111, ROM 112, and RAM 113 may be interconnected via an internal bus.

The controller 110 may control at least one of the communication module 120, the multimedia module 140, the camera module 150, the input/output module 160, the sensor module 170, the status indicator 171, the storage 175, the power supply 180, the touch screen 190, and the touch screen controller 195.

In an embodiment of the present disclosure, the controller 110 may control operations of the status indicator 171. For example, the controller 110 collects status information of the electronic device 100, and may control the status indicator 171 to be operated in a predetermined form in response to the collected status information. For example, the controller 110 may control the status indicator 171 to be turned on for a predetermined period of time in a predetermined color (e.g., red, green, blue, etc.) in response to a status, such as battery charging status, incoming message or calls, voice recording status, etc.

The controller 110 may also determine whether a cover of the electronic device 100 is open or closed. If the controller 110 attempts to activate the status indicator 171 while the cover is closed, in an embodiment, the controller 110 may display information corresponding to the operation of the status indicator 171 on the display unit, e.g., the touch screen 190. In another embodiment, the controller 110 may control the status indicator 171 to be deactivated or turned off. Related detailed description will be discussed later.

The controller 110 may also detect an input unit 168 approaching the touch screen 190 or any other user input event, such as a hovering event that occurs when the user is hovering near the touch screen 190. The controller 110 may also detect various user inputs received not only through the touch screen 190 but also through the camera module 150, the input/output module 160, the sensor module 170, and the like. The user input may include different forms of information entered into the electronic device 100, such as touches, user gestures, voice, pupil movements, iris recognition, vital signs, etc. The controller 110 may control predetermined operations or functions to be performed in the electronic device 100 in response to the user inputs. The controller 110 may send control signals to the input unit 168 or the vibration unit 164. The control signals may include information about vibrating patterns and the input unit 168 or the vibration unit 164 vibrates according to the vibrating patterns.

The electronic device 100 may include at least one of the mobile communication module 121, the WLAN module 131 and the short range communication module 132 depending on the device's capability.

The mobile communication module 121 may connect the electronic device 100 to an external electronic device through mobile communication using at least one—one or more—antennas (not shown) under control of the controller 110. The mobile communication module 121 may transmit/receive wireless signals for voice calls, video conference calls, Short Message Service (SMS) messages, or Multimedia Messaging Service (MMS) messages to/from a cell phone (not shown), a smart phone (not shown), a tablet PC (not shown), or another device not shown), the phones having phone numbers entered into the electronic device 100.

The sub-communication module 130 may include at least one of the WLAN module 131 and the short-range communication module 132. For example, the sub-communication module 130 may include either the WLAN module 131 or the-short range communication module 132, or both.

The WLAN module 131 may be connected to the Internet in a place where there is a wireless Access Point (AP), under control of the controller 110. The WLAN module 131 may support Institute of Electrical and Electronic Engineers' (IEEE's) WLAN standard IEEE802.11x. The short range communication module 132 may conduct short range communication between the electronic device 100 and an external electronic device under control of the controller 110. The short-range communication may include Bluetooth, Infrared Data Association (IrDA), WiFi-Direct, Near Field Communication (NFC), etc.

The broadcast communication module 141 may receive broadcast signals (e.g., television broadcast signals, radio broadcast signals, or data broadcast signals) and additional broadcast information (e.g., Electric Program Guide (EPG) or Electric Service Guide (ESG)) transmitted from a broadcasting station through a broadcast communication antenna (not shown), under control of the controller 110.

The multimedia module 140 may include the audio play module 142, or the video play module 143. The audio play module 142 may play digital audio files (e.g., files having extensions, such as mp3, wma, ogg, or way) stored in the storage 175 or received under control of the controller 110. The video play module 143 may play digital video files (e.g., files having extensions, such as mpeg, mpg, mp4, avi, move, or mkv) stored or received under control of the controller 110. The multimedia module 140 may or may not be incorporated in the controller 110.

The camera module 150 may include at least one of the first and second cameras 151 and 152 for capturing still images, video footages, or panorama photos under control of the controller 110. The camera module 150 may include at least one of the lens barrel 155 for zooming in/out to capture an object, the motor unit 154 for controlling the movement of the lens barrel 155, the flash 153 for providing auxiliary light used in capturing an object. The first camera 151 may be placed on the front of the electronic device 100 and the second camera 152 may be placed on the back of the electronic device 100.

The input/output module 160 may include at least one button 161, the microphone 162, the speaker 163, the vibration unit 164, the connector 165, the keypad 166, the headset jack 167, and the input unit 168. However, the input/output module 160 are not limited to the aforementioned elements, but may also include a mouse, a trackball, a joystick, or a cursor control such as cursor direction keys to control the movement of the cursor on the touch screen 190.

The button 161 may be arranged on the front, side, or back of the housing (or the case) of the electronic device 100, and may include at least one of power/lock button, volume button, menu button, home button, back button, and search button. The microphone 162 may generate electric signals from voice or sound received, under control of the controller 110. The speaker 163 may output a sound corresponding to various signals or data (e.g., wireless data, broadcasting data, digital audio data, digital video data, etc.) to the outside under control of the controller 110. The speaker 163 may output sounds (e.g., button-press sounds, ringback tones, the other party's voice, etc.) originated from functions performed by the electronic device 100. There may be one or multiple speakers 163 arranged in a proper position or proper positions of the housing of the electronic device 100.

The vibration unit 164 may convert an electric signal to a mechanical vibration under control of the controller 110. For example, the electronic device 100 in a vibrating mode operates the vibration unit 164 when receiving a voice or video call from another device (not shown). There may be one or more vibration units 164 inside the housing of the electronic device 100. The vibration unit 164 may operate in response to user inputs through the touch screen 190.

The connector 165 may be used as an interface for connecting the electronic device 100 to an external electronic device or a power source (not shown). The controller 110 may transmit or receive data stored in the storage 175 of the electronic device 100 to or from the external electronic device via a cable connected to the connector 165. The electronic device 100 may be powered from the power source via a cable connected to the connector 165 or may charge the battery using the power source.

The keypad 166 may receive key inputs from the user to control the electronic device 100. The keypad 166 may include a physical keypad (not shown) formed in the electronic device 100, or a virtual keypad (not shown) displayed on the touchscreen 190. The mechanical keypad formed in the electronic device 100 may be omitted depending on the performance or structure of the electronic device 100. A headset may be connected to the electronic device 100 by being plugged in the headset jack 167.

The input unit 168 may be inserted and kept in the electronic device 100 and be drawn out and detached from the electronic device 100. An attachment/detachment recognition switch 169 is equipped in somewhere of the electronic device 100 to which the input unit 168 is inserted. The attachment/detachment recognition switch 169 operates according to attachment or detachment of the input unit 168 and sends the resulting signal to the controller 110. The attachment/detachment recognition switch 169 may be configured to make a direct or indirect contact with the input unit 168 when the input unit 168 is attached. Based on whether the attachment/detachment recognition switch 169 contacts the input unit 168, the attachment/detachment switch 169 may generate a signal corresponding to attachment or detachment of the input unit 168, i.e., a signal notifying whether the input unit 168 is attached or detached, and send the signal to the controller 110.

The sensor module 170 includes at least one sensor for detecting a status of the electronic device 100. For example, the sensor module 170 may include at least one of a proximity sensor for detecting proximity of a user to the electronic device 100; an illumination sensor for detecting an amount of ambient light of the electronic device 100; a motion sensor for detecting the motion of the electronic device 100 (e.g., rotation of the electronic device 100, acceleration or vibration applied to the electronic device 100); a geomagnetic sensor for detecting a direction using the geomagnetic field; a gravity sensor for detecting a direction of gravity action; an altimeter for detecting an altitude by measuring atmospheric pressure; a Global Positioning System (GPS) module 157, etc.

The GPS module 157 receives radio signals from a plurality of GPS satellites in Earth's orbit, and may calculate the position of the electronic device 100 by using time of arrival from the GPS satellites to the electronic device 100.

The storage 175 may store signals or data input/output according to operations of the communication module 120, the multimedia module 140, the camera module 150, the input/output module 160, the sensor module 170, or the touchscreen 190 under control of the controller 110. In various embodiments of the present disclosure, various status information of the electronic device 100 may be stored. Operation information of the status indicator 171 which corresponds to status information of the electronic device 100 may also be stored. In an embodiment of the present disclosure, if the cover is closed, information corresponding to the operation of the status indicator 171, which is instead displayed in an area of the display unit, e.g., the touch screen 190 which is exposed through the screen window formed on the cover, may be stored.

The storage 175 may store applications and control programs for controlling the electronic device 100 or the controller 110. In an embodiment of the present disclosure, one of the applications or the control programs checks whether the cover is closed or open, and may control information corresponding to operations of the status indicator 171 to be displayed on at least a part of the touch screen 190 when it is determined that the cover is closed.

The term "storage" refers not only to the storage 175, but also any other data storage, such as the ROM 112, RAM 113 in the controller 110, or a memory card (e.g., a Secure Digital (SD) card, a memory stick) installed in the electronic device 100. The storage 175 may also include a non-volatile memory, a volatile memory, a Hard Disc Drive (HDD), or a Solid State Drive (SSD).

The storage 175 may store many different functional applications, such as navigation systems, games, time-base alarming applications, and the like, images for graphical user interface (GUI) associated with the applications, databases related to user information, documents, methods for handling touch inputs, background images (e.g., menu screen, standby screen, etc.) used in operating the electronic device 100, operating programs, images captured by the camera module 150, or the like.

The storage 175 is a machine-readable (or computer-readable) medium, which may be defined as a medium for providing data for a machine to perform a particular function. The storage 175 may include non-volatile and volatile media. These media should be all tangible for a mechanical device to read out instructions embodied on the media.

The machine-readable media includes, but not exclusively, at least one of floppy disks, flexible disks, hard disc, magnetic tapes, compact disc read-only memories (CD-ROMs), optical discs, punch cards, paper tapes, random access memories (RAM), programmable read-only memories (PROM), erasable PROM (EPROM), flash-EPROMs, embedded multimedia cards (eMMCs).

The power supply 180 may supply power to one or more batteries placed inside the housing of the electronic device 100, under control of the controller 110. The one or more batteries power the electronic device 100. The power supply 180 may supply the electronic device 100 with power input from the external power source via a cable connected to the connector 165. The power supply 180 may also provide the electronic device 100 with wireless power from an external power source using a wireless charging technology.

The electronic device 100 may have the at least one touch screen 190 to provide the user with GUIs for various services (e.g., call, data communication, broadcasting, photography and the like). The touch screen 190 may send an analog signal corresponding to at least one user input to a GUI to the touchscreen controller 195.

The touch screen 190 may receive at least one user input of the user's body part (e.g., digit including thumb) or the input unit 168 (e.g., a stylus pen, an electronic pen, etc.). The touch screen 190 may be implemented in e.g., a resistive way, capacitive way, infrared way, acoustic wave way, or a combination thereof.

The touch screen 190 may also include at least two touch panels each detecting proximity or touches of a digit or the input unit 168 to receive inputs of the digit or the input unit 168, respectively. The at least two touchscreen panels provide different output values to the touch screen controller 195, and the touch screen controller 195 may distinguish inputs made by the digit from inputs made by the input unit through the touch screen 190 by differently recognizing the values input from the at least two touch screen panels.

The touches are not limited to physical touches by physical contacts of the user or contacts with the touchable input means, but may also include touchless (e.g., keeping a detectable distance less than 1 mm between the touch screen 190 and the user's body or touchable input means). The detectable distance from the touch screen 190 may vary depending on the performance or structure of the electronic device 100.

The touch screen controller 195 converts an analog signal input from the touch screen 190 to a digital signal and sends the digital signal to the controller 110. The controller 110 may control the touch screen 190 by using the digital signal received from the touch screen controller 195. The touch screen controller 195 may determine not only where the user input is made but also a hovering distance by detecting a value (e.g., a current value) output through the touch screen 190, convert the determined distance to a digital signal (e.g., in Z coordinate), and provide the digital signal to the controller 110. Furthermore, the touch screen controller 195 may detect pressure of the user input means on the touch screen 190 by detecting a value (e.g., a current value) output through the touch screen 190, convert the detected pressure to a digital signal, and provide the digital signal to the controller 110.

FIG. 1B illustrates a frontal view of an electronic device, according to an embodiment of the present disclosure.

Referring to FIG. 1B, the touch screen 190, an example of a display unit of the electronic device 100 is arranged on the center of the front face 100a of the electronic device 100. The touch screen 190 may also be formed to take up a major portion of the front face 100a of the electronic device 100. FIG. 1B illustrates a main home screen being displayed on the touch screen 190. The main home screen is a first screen to be displayed on the touch screen 190 when the electronic device 100 is powered on. If the electronic device 100 has several pages of different home screens, the main home screen may be the first of the several pages of home screens. In the main home screen, shortcut icons 191-1, 191-2, 191-3 for running frequently-used applications, a main menu key (also referred to as App key) 191-4, a time indicator, a weather indicator, etc. may be displayed. If the user selects the main menu key 191-4, a menu screen is displayed on the touch screen 190. In an upper part of the touch screen 190, there may be a status bar 192 for displaying statuses of the electronic device 100, such as a battery charging state, intensity of received signals, current time, etc.

In an embodiment of the present disclosure, the status indicator 171 may be arranged on a particular location (e.g., on the top) of the front face 100a of the electronic device 100. The status indicator 171 may be implemented in various forms. For example, the status indicator 171 may be implemented with an LED that flickers in a predetermined color for a predetermined period of time, to indicate a particular status (e.g., a battery charging state, a notification state that there is an unread message or unanswered call, a notification state that voice recording is underway, etc.).

In a lower part of the touch screen 190, there may be a home button 161a, a menu button 161b, and a back button 161c arranged. The home button 161a is to display the main home screen on the touch screen 190. For example, if the home button 161a is selected while any home screen other than the main home screen or a menu screen is displayed in the touch screen 190, the main home screen may be displayed on the touch screen 190. Furthermore, while applications are running on the touch screen 190, if the home button 161a is selected, the main home screen, as shown in FIG. 2, may be displayed on the touch screen 190. The home button 161a may also be used to display recently used applications or a task manager on the touch screen 190.

The menu button 161b provides a link menu that may be displayed on the touch screen 190. The link menu may include a widget addition menu, background change menu, search menu, edit menu, environment setting menu, etc.

The back button 161c may be used to display a screen that was displayed right before a current screen or stop a most recently used application.

On the edge of the front face 100a of the electronic device 100, the first image sensor 151, the illumination sensor 170a, and the proximity sensor 170b may be arranged. On the back of the electronic device 100, the second camera 152, the flash 153, and the speaker 163 may be placed.

On the side 100b of the electronic device 100, e.g., a power/reset button 161d, a volume button 161e that consists of a volume up button 161f and a volume down button 161g, a terrestrial Digital Multimedia Broadcasting (DMB) antenna 141a for broadcast reception, one or more microphones 162, etc. may be placed. The DMB antenna 141a may be fixed to the electronic device 100, or be removably arranged.

On the lower side of the electronic device 100, the connector 165 is formed. The connector 165 has a number of electrodes and may connect the electronic device 100 to an external device via a cable. On the upper side of the electronic device 100, the headset jack 167 may be formed. The headset jack 167 may receive a headset.

The input unit 168 may be equipped on the lower side of the electronic device 100. The input unit 168 may be inserted and kept in the electronic device 100 and be drawn out and detached from the electronic device 100.

Thus far, configuration of the electronic device 100 was described in detail as an example of an electronic device to which various embodiments of the present disclosure may be applied.

Various embodiments of the structure of a cover attached to the electronic device 100 will be described below with reference to FIGS. 2 to 4.

Figure 2A:
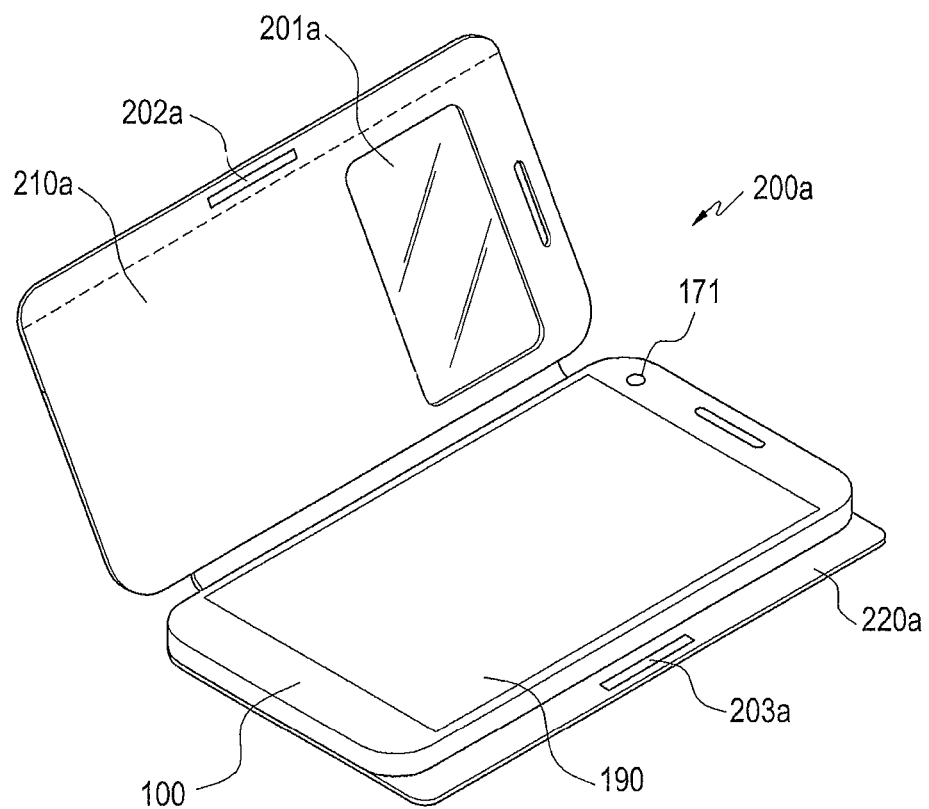
FIGS. 2A to 2D schematically illustrate an electronic device with a cover having a screen window formed thereon, according to an embodiment of the present disclosure.
Figure 2B:
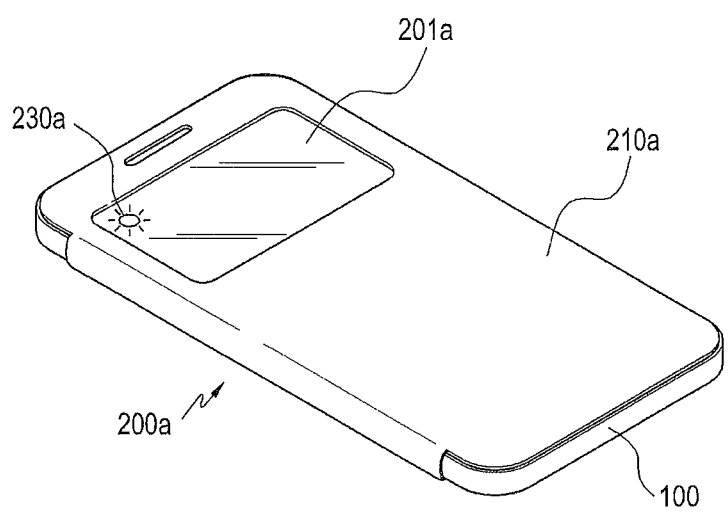
Figure 2C:
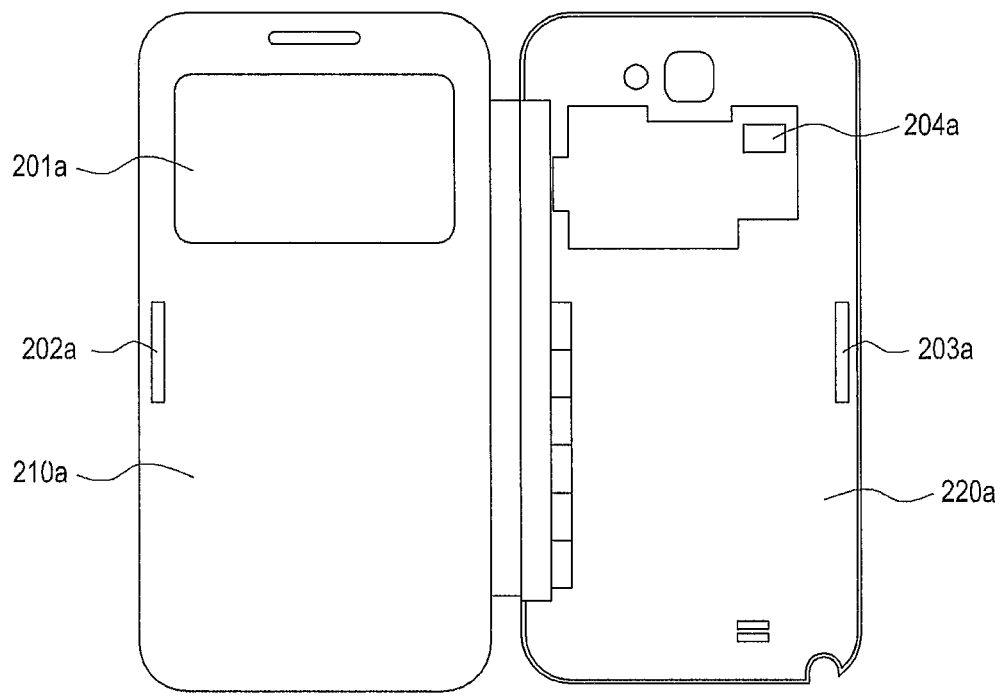
Figure 2D:
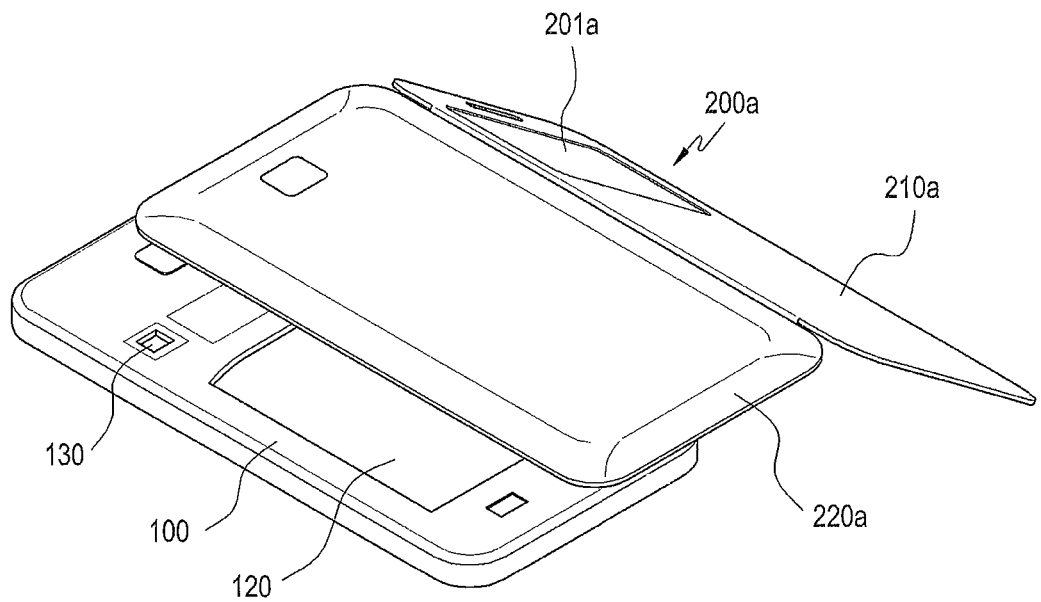
Figure 3A:
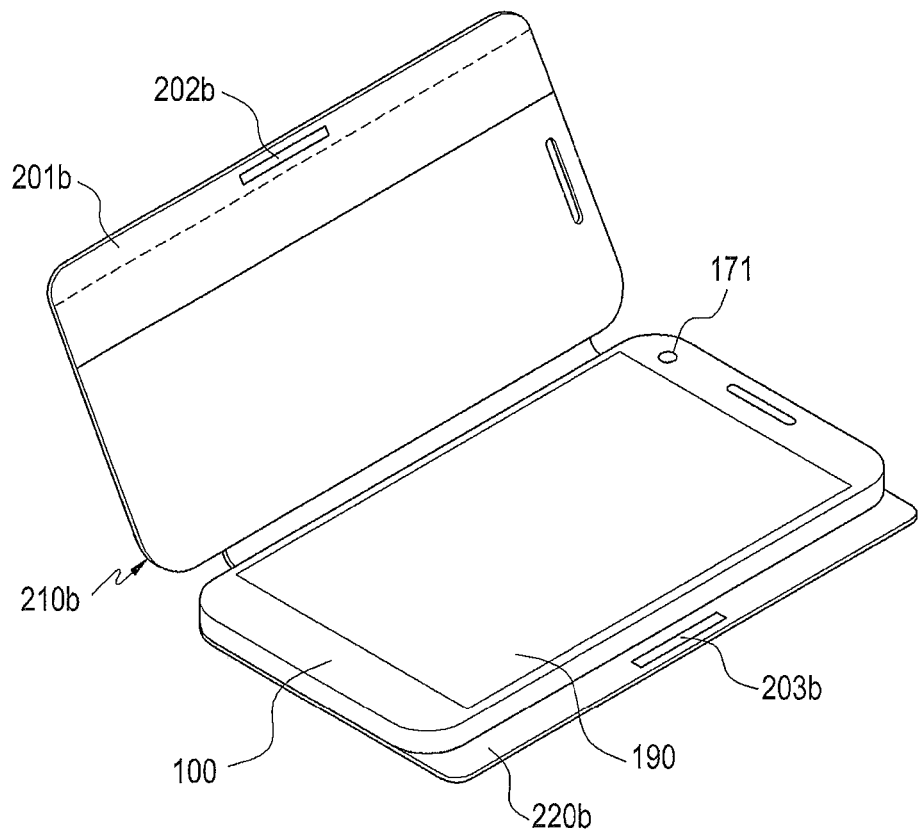
FIGS. 3A to 3C schematically illustrate an electronic device and cover having a screen window, according to another embodiment of the present disclosure.
Figure 3B:
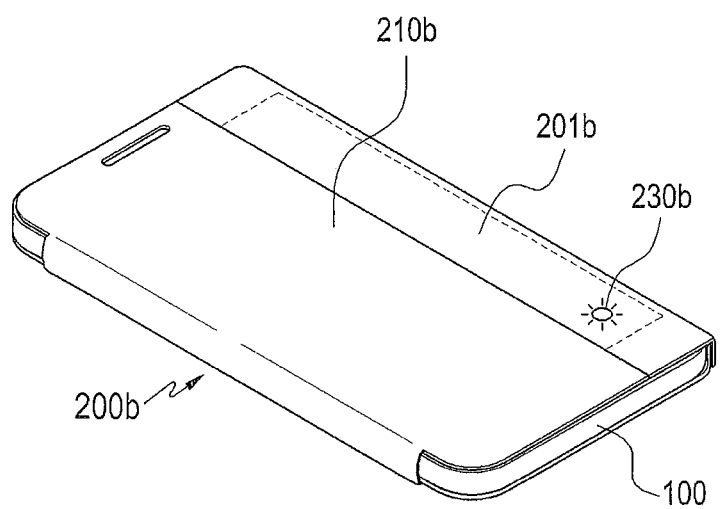
Figure 3C:
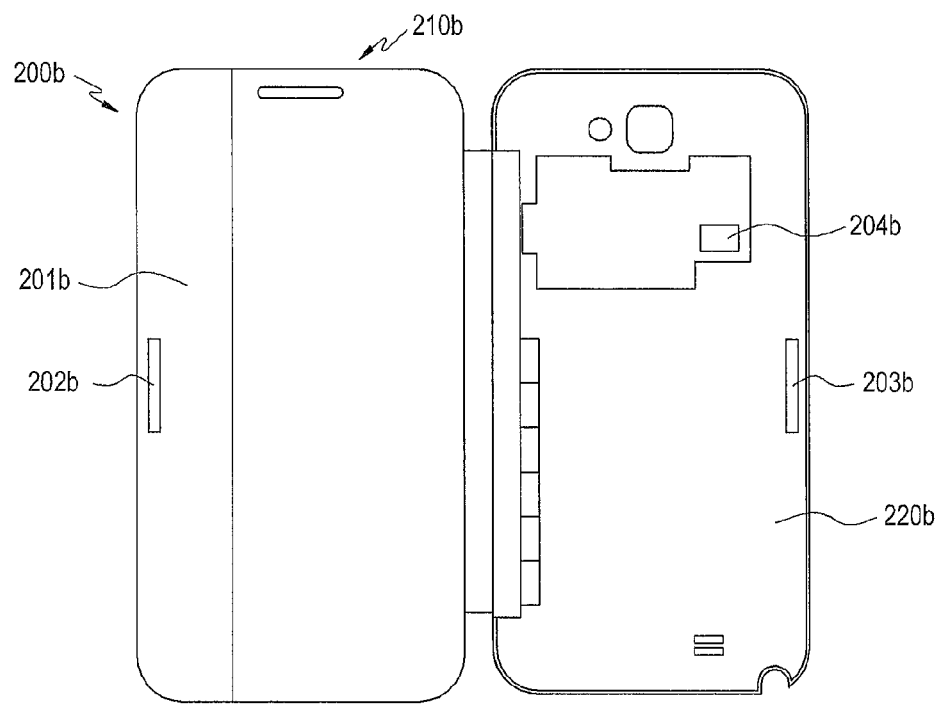
Figure 4A:
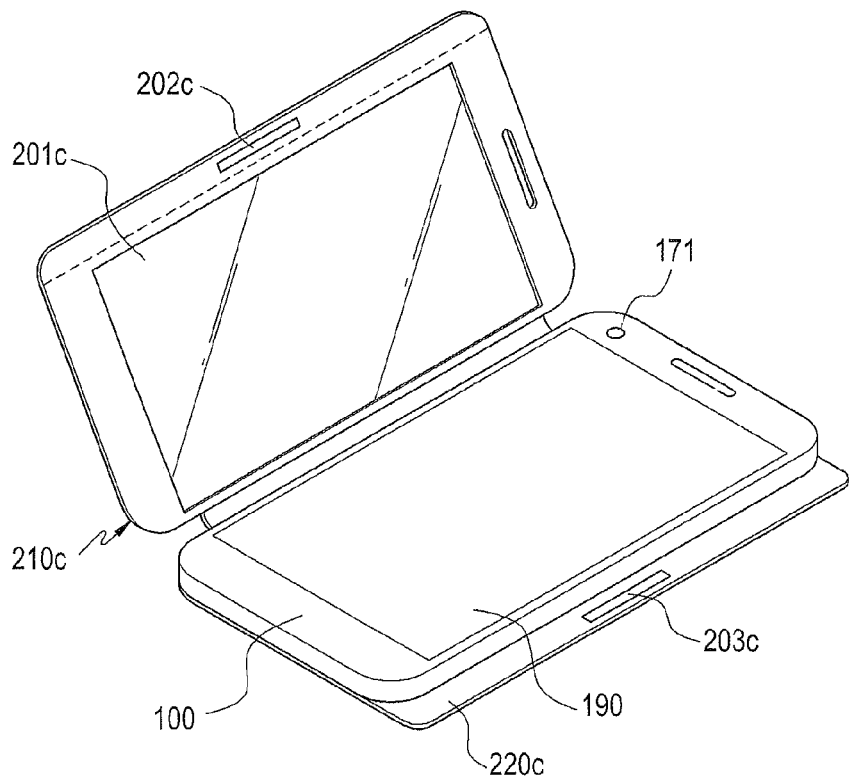
FIGS. 4A to 4C schematically illustrate an electronic device and cover having a screen window, according to another embodiment of the present disclosure.
Figure 4B:
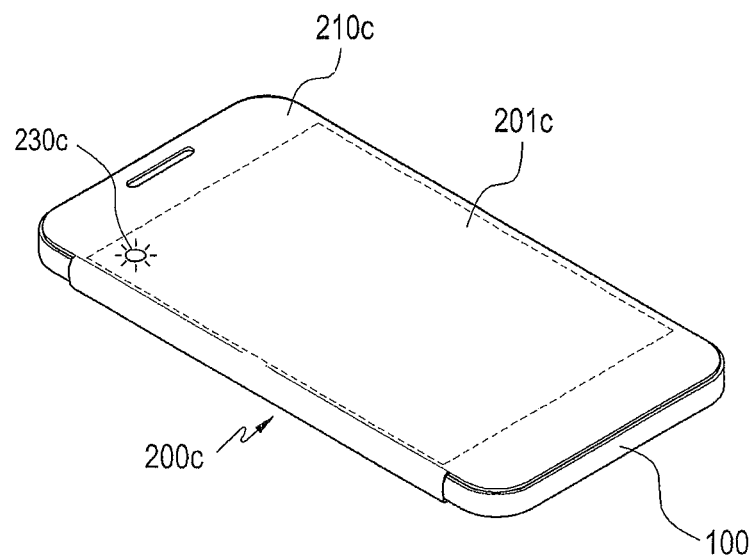
Figure 4C:
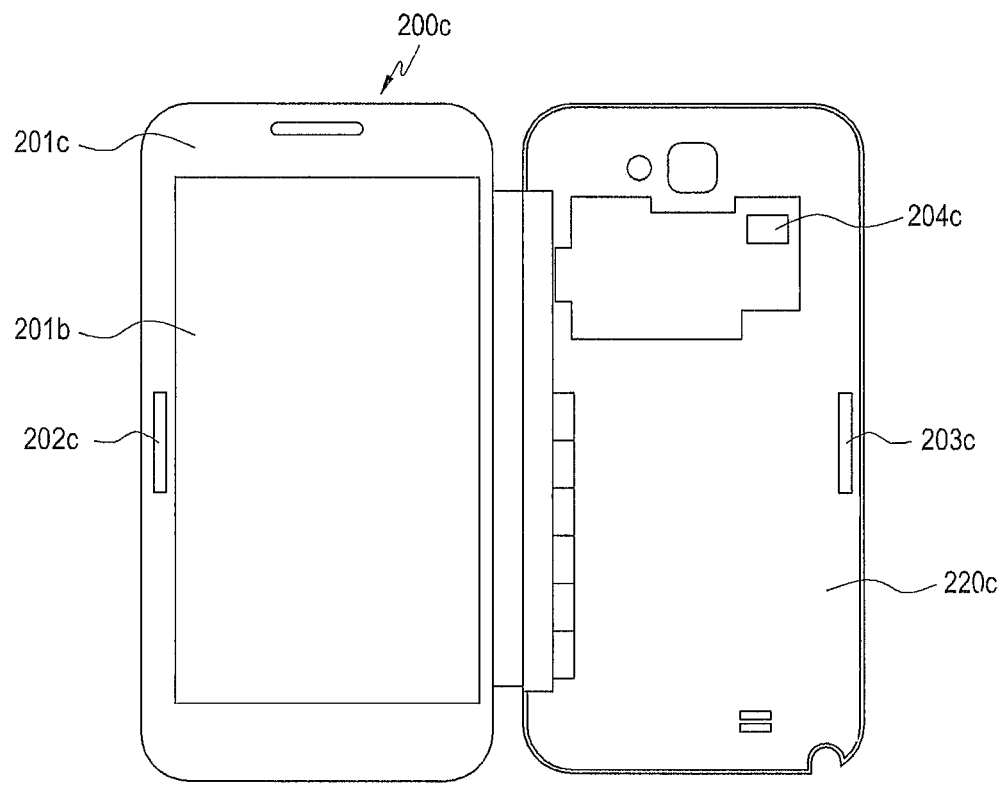

FIGS. 2A to 2D illustrate a cover having a screen window formed in a central upper part of the cover, FIGS. 3A to 3C illustrate a cover having a screen window formed on the left or right side of the cover, and FIGS. 4A to 4C illustrate a cover having a screen window that takes up almost all of the cover. The present disclosure may be applied to a cover having a screen window formed in any shape, location, and size.

FIGS. 2A to 2D schematically illustrate an electronic device with a cover having a screen window formed thereon, according to an embodiment of the present disclosure; FIGS. 3A to 3C schematically illustrate an electronic device with a cover with a screen window formed thereon, according to another embodiment of the present disclosure; and FIGS. 4A to 4C schematically illustrate an electronic device with a cover with a screen window formed thereon, according to another embodiment of the present disclosure. First, referring to FIGS. 2A to 2D, an embodiment of an electronic device with a cover having a screen window formed thereon will be described, elements and their reference numerals of which will be applied, mutatis mutandis, to other embodiments. The electronic device 100 may be equipped with any of covers 200a, 200b, 200c as will be described below.

FIG. 2A schematically illustrates the electronic device 100 equipped with a cover having a screen window formed thereon, according to an embodiment of the present disclosure.

Referring to FIG. 2A, the electronic device 100 may be protected by a cover 200a (or a case) having a screen window 201a. The cover 200a may include a front cover 210a and a back cover 220a, or may only include a front cover.

Referring to FIG. 2B, when the electronic device 100 is attached to the cover 200a, part of the touch screen 190 may be exposed through the screen window 201a. The screen window 201a may be formed of a transparent or translucent material, or as an opening. Thus, when the part of the touch screen 190 is exposed through the screen window 201a, at least a part of a screen displayed on the touch screen 190 may be shown through the screen window 201a.

As shown in FIG. 2B, the screen window 201a may be formed in an area of the cover 200a which corresponds to an upper part of the electronic device 100. However, the area where the screen window 201a is formed is not limited thereto, and in other embodiments of the present disclosure, the screen window 201a may be formed anywhere on the cover 200a.

The front cover 210a may include an attachment 202a, and even the back cover 220a may include an attachment 203a. The controller 110 may detect the opening/closing of the cover 200a by determining whether the attachment 202a of the front cover 210a moves away from the attachment 203a of the back cover 220a. However, a mechanism to detect the opening/closing of the cover 200b is not limited thereto, but there may be various other mechanisms for detecting the opening/closing of the cover 200b in other embodiments.

Referring to FIG. 2A, the status indicator 171 may be equipped on a particular position of the electronic device 100 to indicate a status of the electronic device 100 in various ways.

For example, the status indicator 171 may come in various forms as shown in Table 1, depending on various statuses of the electronic device 100.

TABLE 1

| Event | Color | Flickering Pattern |
|---|---|---|
| Being Charged | Red | Remain Turned On |
| Charging Complete | Green | Remain Turned On |
| Low battery Level | Red | Off for 5,000 ms and On for 500 ms |
| Charging Error | Red | Off for 500 ms and On for 500 ms |
| Notification of Unread messages or unanswered calls | Blue | Off for 5,000 ms and On for 500 ms |
| Voice Recording | Blue | Off for 500 ms and On for 500 ms |

Referring to Table 1, the status indicator 171 may be lighted in red, for example, during charging of the electronic device 100. The red lighting state may remain until a charging cable is detached from the electronic device 100, charging is complete, a charging error occurs, or any other different event (e.g., unread message, unanswered call, etc.) occurs.

If the electronic device 100 has been charged completely, the status indicator 171 may be lighted in green. The green lighting state may remain until a charging cable is detached from the electronic device 100, a charging error occurs, or any other different event (e.g., unread message, unanswered call, etc.) occurs.

If the battery equipped in the electronic device 100 falls below a predetermined voltage level, e.g., 15% of the total level, the status indicator 171 may be periodically lighted in red to indicate the low battery state. For example, operations of turning off for 5,000 ms and on for 500 ms in red may be repeated. When the status indicator 171 flickers red, the user may recognize that the electronic device 100 needs to be charged. The red flickering state may remain until charging begins with a charging cable being connected to the electronic device 100, or any other different event (e.g., unread message, unanswered call, etc.) occurs.

If a charging error occurs in the electronic device 100, the status indicator 171 may flicker red. For example, operations of turning off for 500 ms and on for 500 ms in red may be repeated. The duration of red lighting in the charging error event may be shorter than the duration of red lighting in the low battery state, as shown in Table 1, and thus the status indicator 171 flickers more frequently, enabling the user to recognize that a charging error occurs. The red flickering state may remain until the charging state returns to normal.

If any other different event (e.g., unread message, unanswered call, etc.) occurs in the electronic device 100, the status indicator 171 may be periodically lighted in blue. For example, operations of turning off for 5,000 ms and on for 500 ms in blue may be repeated. The blue flickering state may remain until the event may be checked up by the user (e.g., until an unread message is checked up by the user).

If voice recording is underway in the electronic device 100, the status indicator 171 may be periodically lighted in blue. For example, operations of turning off for 500 ms and on for 500 ms in blue may be repeated. The blue flickering state may remain until the voice recording event ends.

As such, the status indicator 171 may indicate various statuses of the electronic device in various lighting colors, various flickering patterns, or various combinations thereof. Status indication is not limited to what are discussed above, but there may be a variety of modifications to the status indication. While a total of six types of events are listed in Table 1, which is classified by the status of the electronic device 100, the number, type, classification of possible events may vary.

Referring to FIG. 2B, when the cover 200a is closed, the status indicator 171 of the electronic device 100 is hidden behind the cover 200a. In this case, on the contrary to the conventional implementation that disables the user to periodically or persistently check from the status indicator 171 what event occurs, various embodiments of the present disclosure enable indication regarding the status information to be displayed on a particular position of the touch screen 190 that may be exposed through the screen window 201a.

While the indication is displayed on the touch screen 190 in the same lighting color and interval as that of the status indicator 171, as shown in FIG. 2B, displaying the indication regarding the status information may be implemented in various other ways. For example, in addition to the way as shown in FIG. 2B, the indication regarding the status information may be displayed as illustrated in FIGS. 10A to 10E, which will be discussed later in detail.

FIG. 2C schematically illustrates a cover for an electronic device. Referring to FIG. 2C, the back cover 220a may be formed to be a battery cover. For example, the back cover 200a may be installed to cover a battery 120 equipped on the back of the electronic device 100. As described above, the cover 200a may include the screen window 201, through which at least a part of the entire touch screen 190 may be exposed. The screen window 201a covers the corresponding part of the front face of the touch screen 190 and allows the user to visually check what is displayed on the touch screen 190. For example, the screen window 201a may be formed of a transparent or translucent material, or as an opening.

Again, the cover 200a may include the attachment 202a formed on the front cover 210a and the attachment 203a formed on the back cover 220a. A connector terminal 204a may be formed on the cover 200a to connect the cover 200a electrically to the electronic device 100. As will be described below, the electronic device 100 may include a connector terminal electrically matched to the connector terminal 204a of the cover 200a. The controller 110 may determine from the connector terminal of the electronic device 100 whether the attachment 202a of the front cover 210a moves away from the attachment 203a of the back cover 220a. More specifically, the attachments may be formed of magnets. Thus, a change in electrical signals may be made when the attachment 202a of the front cover 210a moves away from the attachment 203a of the back cover 220a. Upon reception of the change in electrical signals through the connector terminal 204a of the cover 200a and the connector terminal of the electronic device 100, the controller 110 may determine that the attachment 202a of the front cover 210a moves away the attachment 203a of the back cover 220a.

Alternatively, an attachment may be formed within the electronic device 100. In this case, the attachment formed within the electronic device 100 may be made of a material that magnetically draws the attachment of the front cover 210a, such as a magnet or iron. The attachment formed within the electric device 100 may be arranged in the back of the touch screen 190 or in bezels of the electronic device 100. A change in electrical signals may be made when the attachment of the front cover 210a moves away from the attachment formed in the electronic device 100. Upon reception of the change in electrical signals through the connector terminal 204a of the cover 200a and the connector terminal of the electronic device 100, the controller 110 may determine that the attachment 202a of the front cover 210a moves away from the attachment formed in the electronic device 100.

In this manner, the electronic device 100 may determine whether the cover 200a is open or closed. However, this is just an example and the present disclosure is not limited thereto. For example, in another embodiment, by way of an example only, a particular sensor, such as proximity sensor, light sensor, etc., which is mounted on the front face of the electronic device 100 may be used to determine whether the cover 200a is open or closed.

FIG. 2D schematically illustrates the back face of the electronic device 100 with the cover 200a. Referring to FIG. 2D, the electronic device 100 may include at least one connector terminal 130. The connector terminal 130 may be electrically connected to the connector terminal 204a of the cover 200a, as described above. The controller 110 may determine from the connector terminal 130 of the electronic device 100 whether the attachment 202a of the front cover 210a moves away from the attachment 203a of the back cover 220a. The back cover 220a may be formed as a battery cover that covers the battery 120 of the electronic device, as shown in FIG. 2D.

While in the embodiment of FIGS. 2B to 2D, the front cover 210a has the screen window 201a formed on the upper part of the front cover 210a, the screen window 201a may be formed in other various locations in other embodiments. For example, as shown in FIGS. 3A to 3C, a screen window 201b may be formed at an edge of a front cover 210b. More specifically, the screen window 201b may be formed at the right edge of the front cover 210b. Furthermore, as shown in FIGS. 4A to 4C, a screen window 201c may be formed to take up almost all of a front cover 210c. Detailed description of the elements shown in FIGS. 3A to 3C, and 4A-4C will be omitted because corresponding elements was described with reference to FIGS. 2A-D. The electronic device 100 may be equipped with any of the covers 200a, 200b, and 200c.

Referring to FIGS. 3A and 3B, the electronic device 100 may be protected by the cover 200b (or a case) having the screen window 201a formed thereon. The cover 200b may include a front cover 210b and a back cover 220b, or may only include a front cover.

Referring to FIG. 3B, when the electronic device 100 is attached to the cover 200b, part of the touch screen 190 may be exposed through the screen window 201b formed at the left edge of the cover 200b while the cover is closed. The screen window 201b may be formed of a transparent or translucent material, or as an opening. Thus, when the part of the touch screen 190 is exposed through the screen window 201b, at least a part of a screen displayed on the touch screen 190 may be shown through the screen window 201b.

The front cover 210a may include an attachment 202b, and even the back cover 220b may include an attachment 203b. Similarly to the embodiment of FIG. 2, the controller 110 may detect the opening/closing of the cover 200b by determining whether the attachment 202b of the front cover 210b moves away from the attachment 203b of the back cover 220b. However, a mechanism to detect the opening/closing of the cover 200h is not limited thereto, but there may be various other mechanisms for detecting the opening/closing of the cover 200b in other embodiments.

Referring to FIG. 3C, as described in connection with FIG. 2C, the cover 200b has a connector terminal 204b formed on the cover 200b, which may be electrically connected to the electronic device 100. As will be described below, the electronic device 100 may include a connector terminal electrically matched to the connector terminal 204b of the cover 200b. The controller 110 may determine from the connector terminal of the electronic device 100 whether the attachment 202b of the front cover 210b moves away from the attachment 203b of the back cover 220b. More specifically, the attachments 202b and 203b may be formed of magnets. A change in electrical signals may be made when the attachment 202b of the front cover 210b moves away from the attachment 203b of the back cover 220b. Upon reception of the change in electrical signals through the connector terminal 204b of the cover 200b and the connector terminal of the electronic device 100, the controller 110 may determine that the attachment 202b of the front cover 210b moves away from the attachment 203b of the back cover 220b. Accordingly, the controller 110 may detect whether the cover 200b is open or closed.

Referring to FIG. 3B, when the cover 200b is closed, the status indicator 171 of the electronic device 100 is hidden behind the cover 200b. In this case, on the contrary to the conventional implementation that disables the user to periodically or persistently check from the status indicator 171 what event occurs, various embodiments of the present disclosure enable indication regarding the status information to be displayed on a particular area of the touch screen 190 that may be exposed through the screen window 201b.

While the indication is displayed on the touch screen 190 in the same lighting color and interval as that of the status indicator 171, as shown in FIG. 3B, displaying the indication regarding the status information may be implemented in various other ways. For example, in addition to the way as shown in FIG. 3B, the indication regarding the status information may be displayed as illustrated in FIGS. 10A to 10E, which will be discussed later in detail.

Referring to FIG. 4A to 4C, the electronic device 100 may be protected by the cover 200c (or a case) having the screen window 201c formed thereon. The cover 200c may include a front cover 210c and a back cover 220c, or may only include a front cover.

Referring to FIG. 4B, when the electronic device 100 is attached to the cover 200c, part of the touch screen 190 may be exposed through the screen window 201c formed to take up almost all of the front cover 210c. The screen window 201c may be formed of a transparent or translucent material, or as an opening. Thus, when the part of the touch screen 190 is exposed through the screen window 201c, at least a part of a screen displayed on the touch screen 190 may be shown through the screen window 201c.

The front cover 210c may include an attachment 202c, and even the back cover 220c may include an attachment 203c. Similarly to the embodiment of FIG. 2, the controller 110 may detect the opening/closing of the cover 200c by determining whether the attachment 202c of the front cover 210c moves away the attachment 203c of the back cover 220c. However, a mechanism to detect the opening/closing of the cover 200b is not limited thereto, but there may be various other mechanisms for detecting the opening/closing of the cover 200b in other embodiments.

Referring to FIG. 4C, as described in connection with FIGS. 2C and 3C, the cover 200c has a connector terminal 204c formed on the cover 200c, which may be electrically connected to the electronic device 100. As will be described below, the electronic device 100 may include a connector terminal electrically matched to the connector terminal 204c of the cover 200c. The controller 110 may determine from the connector terminal of the electronic device 100 whether the attachment 202c of the front cover 210c moves away from the attachment 203c of the back cover 220c. More specifically, the attachments 202c and 203c may be formed of magnets. A change in electrical signals may be made when the attachment 202c of the front cover 210c moves away from the attachment 203c of the back cover 220c. Upon reception of the change in electrical signals through the connector terminal 204c of the cover 200c and the connector terminal of the electronic device 100, the controller 110 may determine that the attachment 202c of the front cover 210c moves away from the attachment 203c of the back cover 220c. Accordingly, the controller 110 may detect whether the cover 200c is open or closed.

As shown in FIG. 4B, when the cover 200c is closed, the status indicator 171 of the electronic device 100 is hidden behind the cover 200c. In this case, on the contrary to the conventional implementation that disables the user to periodically or persistently check from the status indicator 171 what event occurs, various embodiments of the present disclosure enable indication regarding the status information to be displayed on a particular position of the touch screen 190 that may be exposed through the screen window 201c.

While the indication is displayed on the touch screen 190 in the same lighting color and period as of the status indicator 171, as shown in FIG. 4B, displaying the indication regarding the status information may be implemented in various other ways. For example, in addition to the way as shown in FIG. 4B, the indication regarding the status information may be displayed as illustrated in FIGS. 10A to 10E, which will be discussed later in detail.

In the following, a procedure of displaying the status of an electronic device will be described with reference to FIGS. 5 and 6, according to some embodiments of the present disclosure.

Figure 5:
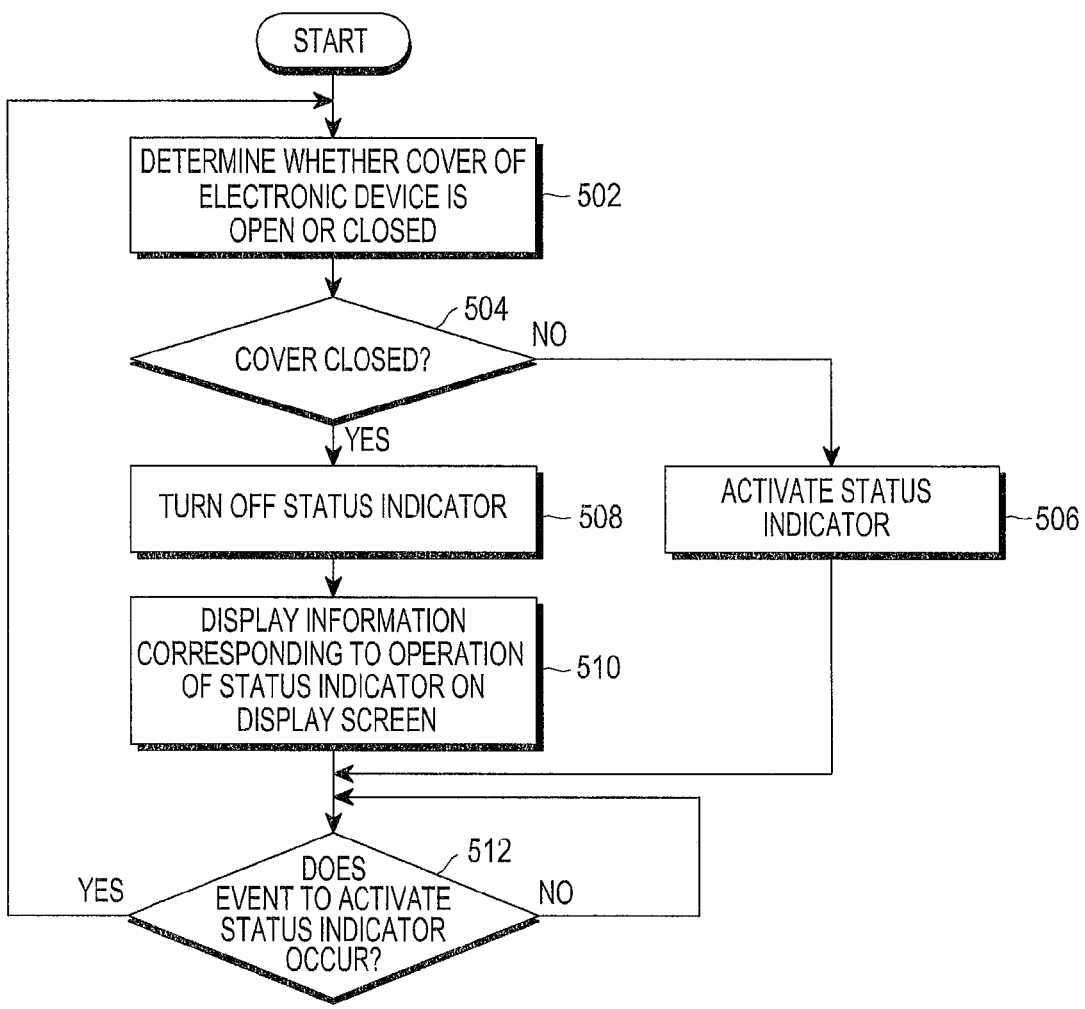
FIG. 5 is flowchart illustrating a procedure of displaying a status of an electronic device, according to an embodiment of the present disclosure.

FIG. 5 is flowchart illustrating a procedure of displaying the status of an electronic device, according to an embodiment of the present disclosure. Referring to FIG. 5, in step 502, it is determined whether the cover (or the case) of the electronic device is open or closed over the electronic device. If in step 504, the cover is open, in step 506, a status indicator equipped in the electronic device operates in a predetermined way. If the electronic device is not equipped with a status indicator separately from the display unit (e.g., touch screen), step 506 may be omitted.

If in step 504, the cover is closed, in step 510, information corresponding to the operation of the status indicator may be displayed on the screen of the display unit. The information may be displayed on a display position that may be exposed through a screen window formed on the cover, thus allowing the user to check the information even while the cover is closed over the electronic device.

Alternatively, if the cover is closed in step 504, the status indicator is controlled not to be activated or turned off, in order to reduce unnecessary power consumption.

When an event that may activate the status indicator occurs, the process returns to step 502 to determine whether the cover is open or closed, and if the cover is closed in step 504, information corresponding to the operation of the status indicator for the event may be displayed on a position of the screen of the display unit, which is exposed to the screen window. Otherwise, if it is determined that the cover is open, the status indicator operates again as described above.

While the opening/closing of the cover is detected when an event that activates the status indicator occurs in this embodiment, detecting the opening/closing of the cover may be periodically or persistently performed in other embodiments, in which case while the cover is closed, a predetermined indication corresponding to the operation of the status indicator may be displayed on the screen without need to determine whether the cover is open or closed.

Figure 6:
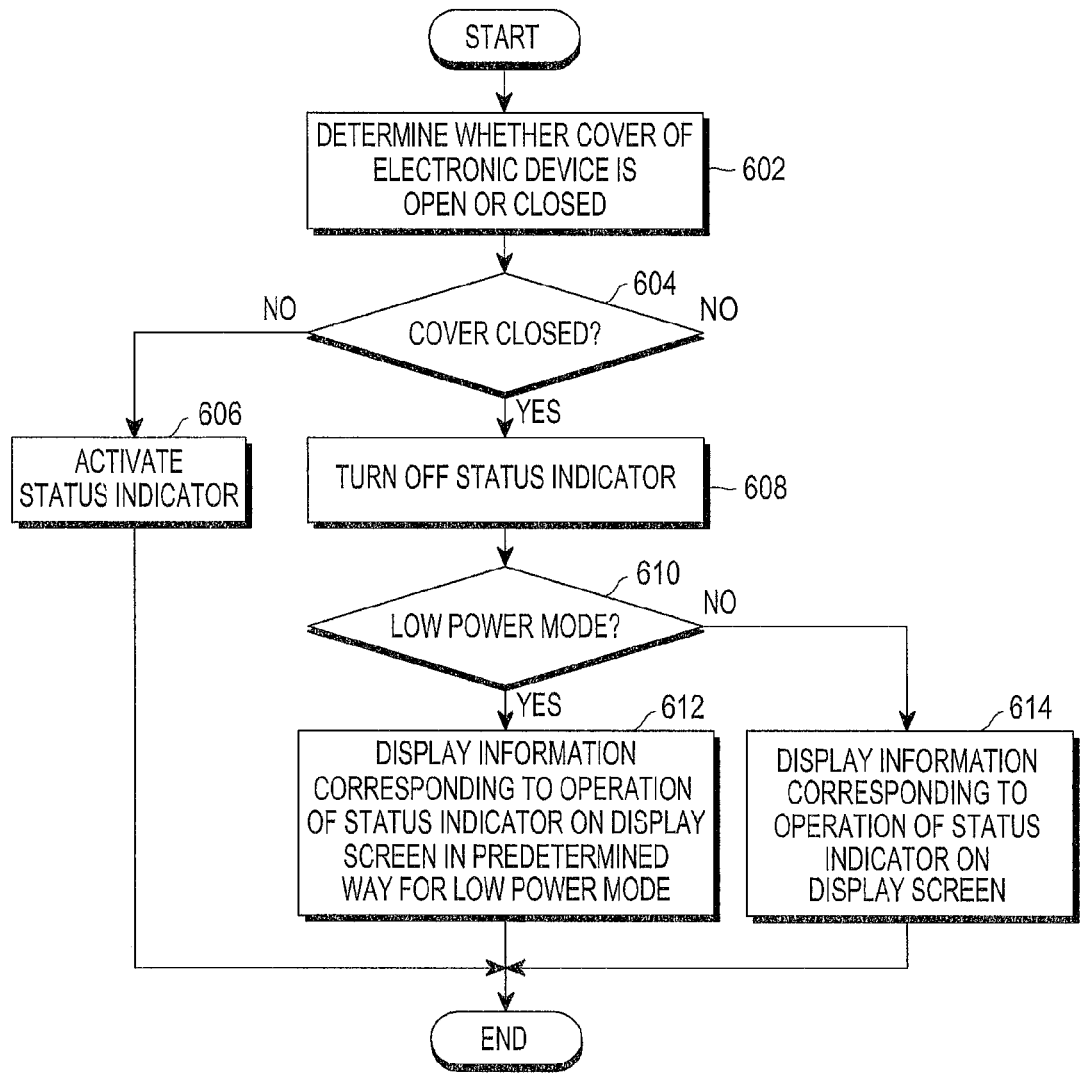
FIG. 6 is flowchart illustrating a procedure of displaying a status of an electronic device, according to another embodiment of the present disclosure.

FIG. 6 is flowchart illustrating a procedure of displaying a status of an electronic device, according to another embodiment of the present disclosure. Referring to FIG. 6, in step 602, it is determined whether the cover (or the case) of the electronic device is open or closed. If in step 604, the cover is open, in step 606, a status indicator equipped in the electronic device operates in a predetermined way. If the electronic device is not equipped with a status indicator separately from the display unit (e.g., touch screen), step 606 may be omitted.

If in step 604, the cover is closed, in step 610, it is determined whether the current screen display mode of the electronic device is in low power mode. If it is not in the low power mode, in step 614, information corresponding to the operation of the status indicator may be displayed on the screen of the display unit. Otherwise, if it is in the low power mode, in step 612, the information corresponding to the operation of the status indicator is displayed on the screen of the display unit in a predetermined way for the low power mode.

For example, as shown in Table 1, when the cover is closed while charging the electronic device 100 is underway and the status indicator 171 is lighted in red, in the embodiment of FIG. 5, a red indication corresponding to the operation of the status indicator 171 may be displayed on the touch screen 190. On the contrary, in the embodiment of FIG. 6, when the cover is closed in low power mode, the indication corresponding to the operation of the status indicator 171 may be implemented in a different way tailored to the low power mode. For example, brightness of the indication may be toned down or lighting color of the indication is changed to black and white, to reduce the power consumption for the low power mode.

Determining whether the cover is open or closed, as shown in FIGS. 5 and 6, may be performed in various other ways. For example, as described in connection with FIGS. 2 to 4, when the cover 200a is open, a change in electrical signals that is made when the front cover 210a moves away from the back cover 220a may be used to determine whether the cover is open or closed. In another example, the controller 110 may use a lighting sensor or proximity sensor equipped in the electronic device 100 to detect whether the cover is open or closed. Alternatively, for detection of the opening/closing of the cover, the controller 110 may use a folding detection sensor formed between the front cover and the back cover.

Methods according to exemplary embodiments of the present disclosure may be implemented in program instructions which are executable by various computing means and recorded in computer-readable media. The computer-readable media may include program instructions, data files, data structures, etc., separately or in combination. The program instructions recorded on the computer-readable media may be designed and configured specially for the present disclosure, or may be well-known to people having ordinary skill in the art of computer software. Examples of the computer readable recording medium include read-only memory (ROM), random-access memory (RAM), Compact Disc (CD)-ROMs, magnetic tapes, floppy disks, optical data storage devices, etc. The computer readable recording medium can also be distributed over network coupled computer systems so that the computer readable code is stored and executed in a distributed fashion. Examples of the program instructions include not only machine language codes but also high-level language codes which are executable by various computing means using an interpreter. The aforementioned hardware devices may be configured to operate as one or more software modules to carry out exemplary embodiments of the present disclosure, and vice versa.

Various embodiments of displaying a screen in an electronic device having a cover attached thereto will be described in connection with FIGS. 7A to 9C.

FIGS. 7A to 7C illustrate displaying a screen in an electronic device having a cover attached thereto, according to an embodiment of the present disclosure. Referring to FIG. 7A, with the front cover 210a closed, the status indicator 171 is hidden behind the front cover 210a, and then status information 320a corresponding to the operation of the status indicator 171 may be displayed on a predetermined position of the touch screen 190 that is exposed through the screen window 201a formed on the cover 200a. The status information 320a herein may be displayed in the same or similar way that the actual status indicator 171 operates.

For example, with the cover 200a closed, the status information 320a may be implemented to be periodically or persistently displayed. Thus, the status information corresponding to each event of Table 1 may be implemented in the same color, lighting pattern, or combination thereof as the status indicator 171 operates, or may be implemented in different ways.

If a particular event (e.g., message reception, incoming call, etc.) occurs while the status information 320a is displayed periodically or persistently with the cover 200a closed over the electronic device 100, an indication that the event has occurred may be displayed as shown in FIG. 7B.

For example, as shown in FIG. 7B, when a particular event occurs, the controller 110 may display information regarding the event together with information indicating the current state of the electronic device 100. In displaying the information indicating the current state of the electronic device 100, the controller 110 may control the information to be displayed at a position of the touch screen 190 exposed through the screen window of the cover.

For example, as shown in FIG. 7B, a screen including hour 302, weather 310, notification 312 and 314, or title or artist 316 of an audio being played may be displayed to be exposed through the window screen.

If the user opens the cover 200a from the closing state, various information may be displayed on the entire touch screen 190. With the cover 200a open, the status indicator 171 is exposed again to the user and may display various information about the status of the electronic device 100 (e.g., status information as shown in Table 1).

If the cover 200a is closed again from the opening state of FIG. 7C, display mode may be returned to what is shown in FIG. 7A, where the status information 320a corresponding to the operation of the status indicator 171 may be displayed in the predetermined position that is exposed through the screen window 201a.

Alternatively, if the cover 200a is closed again from the opening state of FIG. 7C, display mode may be returned to what is shown in FIG. 7B, where various information predetermined based on a predetermined screen mode may be displayed within a predetermined screen area that is exposed through the screen window 201a.

If there has been no user input for a certain period of time, the screen, as displayed in FIG. 7B, is turned off to reduce power consumption. Alternatively, if there has been no user input for a certain period of time, the screen of FIG. 7B may be switched to what is shown in FIG. 7A, where the status information 320a corresponding to the operation of the status indicator 171 is displayed.

FIGS. 8A to 9C each illustrate an electronic device attached to a cover with a screen window modified in size and position, detailed description of which will be omitted herein because they operate the same way as described in connection with FIGS. 7A to 7C.

In the meantime, screen display mode may be classified by different events as shown in FIGS. 7A to 9C, into status indicator display mode, screen window display mode, and full screen display mode, which may be represented in Table 2.

TABLE 2

| Screen Mode | Cover | Display Area | Display Method | Display Condition |
| --- | --- | --- | --- | --- |
| Status Indicator Display Mode | Closed | Part or Entire Screen Window | Color, Flickering Pattern, Text | repetitive and persistent display based on current status while the cover is closed |
| Screen Window Display Mode | Closed | Entire Screen Window | Unlimited | display for a certain period of time while the cover is closed; when a particular event occurs |

TABLE 2-continued

| Screen Mode | Cover | Display Area | Display Method | Display Condition |
| --- | --- | --- | --- | --- |
| Full Screen Display Mode | Open | Entire Screen | Unlimited | while the cover is closed, display for a certain time display for a certain period of time while the cover is closed |

Referring to Table 2, the status indicator display mode is a screen mode as shown in FIGS. 7A, 8A, and 9A, where an indication corresponding to the operation of the status indicator 171 is displayed through a part or the entire of the screen window while the cover is closed. The status indicator display mode may save electricity the most among the three screen modes, because in the status indicator display mode, various status information of the electronic device may be indicated periodically or persistently for the user to check basic statuses of the electronic device (e.g., battery charging status, unread message, unanswered call, voice recording status, etc.) at low power. In the status indicator display mode, the status information may be displayed by means of lighting colors, lighting patterns, simple text, etc., to reduce power consumption.

The screen window display mode is a screen mode as shown in FIGS. 7B, 8B, and 9B, where predetermined information may be displayed through the screen window. For example, if the cover is open from the closing state or a predetermined event occurs while the cover is closed, the electronic device may operate in the screen window mode for a predetermined period of time. After a lapse of the predetermined period of time, the screen is turned off or switched back into the status indicator display mode in which the status information corresponding to the operation of the status indicator is displayed. In the status indicator display mode, the status information may be displayed by means of lighting colors, lighting patterns, simple text, etc. In the screen window display mode, hour 302, weather 310, notification 312 and 314, title or artist 316 of an audio file being played, etc. may be displayed in part of the screen area that is exposed through the screen window.

The full screen display mode is a screen mode as shown in FIGS. 7C, 8C, and 8C, where various information is displayed in the full screen while the cover is open. For example, when the cover is open from the closing state or the user enters an input in the screen-off mode while the cover is open, the electronic device may operate in the full screen display mode.

Thus far, various screen modes in relation to the opening/closing of the cover attached to an electronic device have been described.

FIGS. 10A to 10E illustrate displaying status information through a screen window, according to various embodiments of the present disclosure.

Figure 10A:
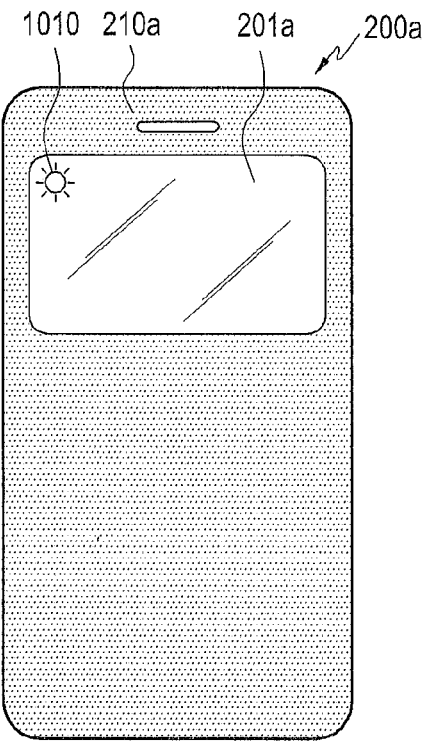
FIGS. 10A to 10E illustrate displaying status information through a screen window, according to various embodiments of the present disclosure.

Referring to FIG. 10A, while the cover is closed, status information 1010 corresponding to the operation of the status indicator 171 may be displayed on part of the screen that is exposed through the screen window 201a. The status information 1010 may be displayed in the same way as the status indicator 171 operates, i.e., in the same color or at the same lighting intervals. If the electronic device operates in low power mode, the status information may be implemented in different ways, such as to be displayed in a different color or brightness from that of the status indicator 171, or may be implemented in black and white.

Figure 10B:
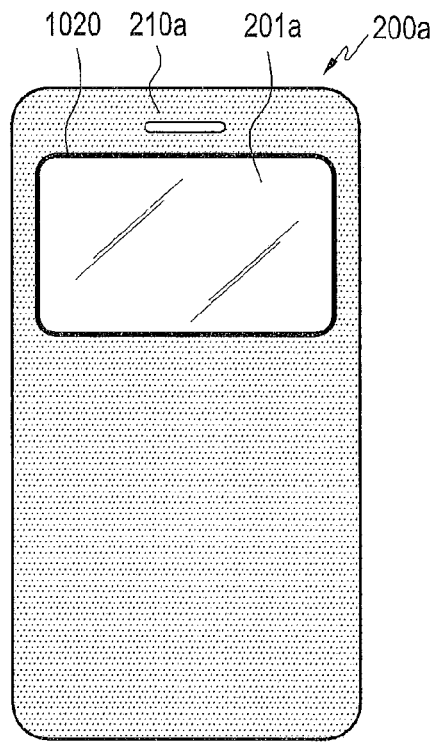

Referring to FIG. 10B, while the cover is closed, status information 1020 corresponding to the operation of the status indicator 171 may be displayed at an edge of a screen area exposed through the screen window 201a. That is, the status information 1020 may be implemented to be a line having a predetermined thickness along the edge, which is lighted in a particular color. For example, the status information 1020 may be indicated in the edge in the same color or lighting intervals as the status indicator 171 operates, but on the contrary to FIG. 10A, the status information 1020 is displayed as the line that is lighted along the edge of the screen area exposed through the screen window 201a. With this indication, the user may recognize the status of the electronic device more intuitively.

Figure 10C:
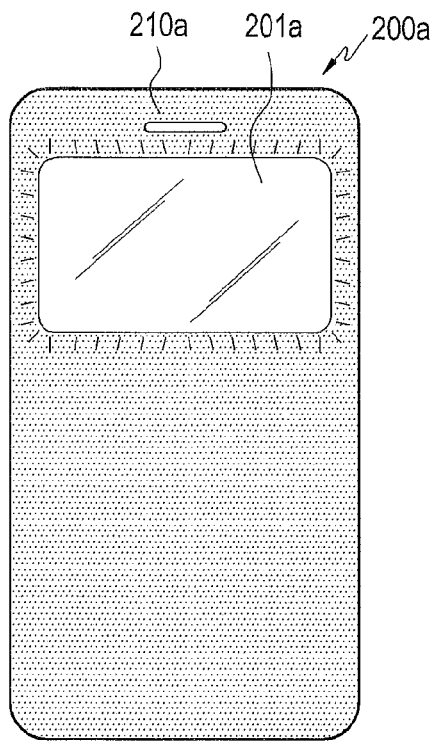

Referring to FIG. 10C, while the cover is closed, status information corresponding to the operation of the status indicator 171 may be displayed in the entire area of the screen, which is exposed through the screen window 201a. For example, the status information may be indicated in the same color or lighting intervals as the status indicator 171 operates, but, on the contrary to FIG. 10A, the status information is displayed in a predetermined color or intervals in the entire area that is exposed through the screen window 201a. With this indication, the user may recognize the status of the electronic device more intuitively.

Figure 10D:
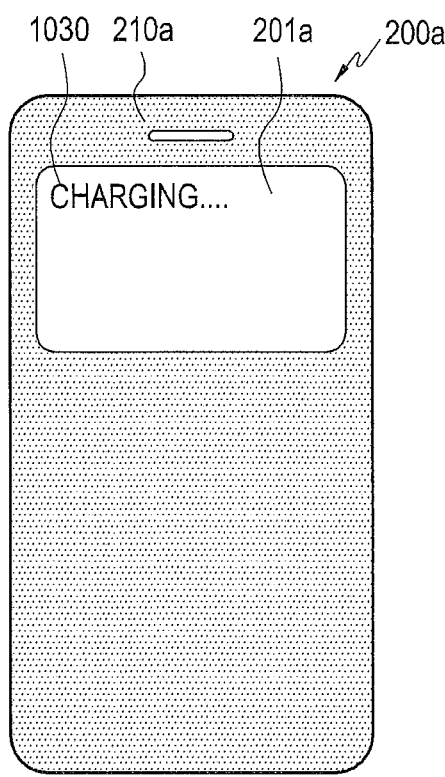

Referring to FIG. 10D, while the cover is closed, status information 1030 corresponding to the operation of the status indicator 171 may be displayed in a text form in a particular screen area exposed through the screen window 201a. For example, the status information 1030 may be displayed in a text format, indicating the operation of the status indicator 171.

For example, while the electronic device is being charged, the status information is indicated as "charging"; when the charging is complete, "full"; when the battery state is low, "low battery"; or when a charging error occurs, "error". If there is an unread message or an unanswered call, e.g., "Unread Message" or "Unanswered Call" may be displayed, and if voice recording is underway, "voice recording" may be displayed.

While in the embodiment of FIG. 10D, the status information is indicated in text, images corresponding to respective statuses (e.g., a battery image for battery charging) may be displayed in other embodiments.

Figure 10E:
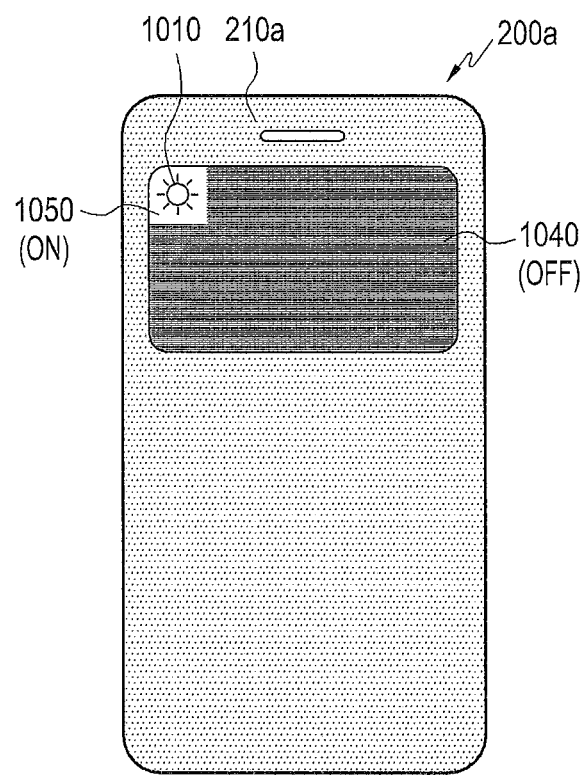

In an embodiment of FIG. 10E, while the cover is closed, for further reduction of power consumption, only a part 1050 of the screen, in which status information 1010 is displayed remains turned on while the remaining area 1040 of the screen, in which the status information 1010 is not displayed is turned off. As such, power consumption may be minimized by selectively turning on a part from among the screen area exposed through the screen window 201a.

For example, if the display unit of the electronic device is implemented with Organic Light Emitting Diodes (OLEDs), light emission or light off may be controlled for each OLED element and thus, as shown in FIG. 10E, it is possible to control a part 1050 where the status information 1010 is displayed to be turned on and the other part to be turned off.

Accordingly, power consumption of the screen display mode as shown in FIG. 10E may be minimized by turning on the part 1050 pixel-by-pixel or in a unit of area, in which the status information 1010 is displayed.

According to the embodiments of the present disclosure, the status of an electronic device may be indicated through a screen window formed on a cover attached to the electronic device even if the cover is closed and thus a status indicator, e.g., an LED indicator is hidden behind the cover.

The embodiments of the present disclosure may also prevent unnecessary power consumption that may otherwise occur when the cover attached to an electronic device is closed and hides the status indicator.

In addition, according to the embodiments of the present disclosure, the status of an electronic device may be persistently indicated even at low power by repeatedly indicating an operation of the status indicator through the screen window formed on a cover attached to the electronic device while the cover is closed.

Several embodiments have been described in connection with e.g., mobile communication terminals, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for displaying a status of an electronic device having a cover attached thereto, the method comprising:
    determining whether the cover is open or closed, the cover including a screen window formed in a portion of the cover;
    checking an operation of a status indicator that is hidden behind a part of the cover except the screen window while the cover is closed; and
    displaying information corresponding to the operation of the status indicator in at least part of a screen area of the electronic device that is exposed through the screen window.

2. The method of claim 1, wherein while the cover is closed, the status indicator is controlled not to be activated.

3. The method of claim 1, wherein while the cover is closed, the information corresponding to the operation of the status indicator is periodically displayed in at least a part of the screen area that is exposed through the screen window.

4. The method of claim 1, wherein while the cover is closed, the information corresponding to the operation of the status indicator is persistently displayed in at least part of the screen area that is exposed through the screen window.

5. The method of claim 1, wherein while the cover is closed, the information corresponding to the operation of the status indicator is displayed by lighting an entirety of the screen area exposed through the screen window in a color matched to the operation of the status indicator.

6. The method of claim 1, wherein while the cover is closed, the information corresponding to the operation of the status indicator is displayed by lighting an edge of the screen area exposed through the screen window.

7. The method of claim 1, wherein while the cover is closed, the information corresponding to the operation of the status indicator is displayed in corresponding text to the operation of the status indicator in at least a part of the screen area that is exposed through the screen window.

8. The method of claim 1, wherein the operation of the status indicator is indicated in a lighting color, lighting pattern, or a combination of the lighting color and lighting pattern.

9. A method for displaying a status of an electronic device having a cover attached thereto, the method comprising:
    determining whether the cover is open or closed, the cover including a screen window formed in a portion of the cover;
    checking status information of the electronic device while the cover is closed; and
    displaying information corresponding to the status information of the electronic device in a lighting color, lighting pattern, or a combination of the lighting color and lighting pattern in at least a portion of a screen area of a display unit of the electronic device, the screen area being exposed through the screen window,
    wherein the status information of the electronic device is hidden behind a part of the cover except the screen window.

10. The method of claim 9, wherein while the cover is closed, the information corresponding to the status information of the electronic device is persistently displayed in at least a part of the screen area that is exposed through the screen window.

11. The method of claim 9, wherein while the cover is closed, the information corresponding to the status information of the electronic device is displayed by lighting an entirety of the screen area exposed through the screen window in a color matched to an operation of a status indicator.

12. The method of claim 9, wherein while the cover is closed, the information corresponding to the status information of the electronic device is displayed by lighting an edge of the screen area exposed through the screen window.

13. An apparatus for displaying a status of an electronic device, the apparatus comprising:
    a display unit configured to display;
    a status indicator configured to perform a predetermined operation depending on a status of the electronic device; and
    a controller configured to:
        determine whether a cover including a screen window formed in a portion of the cover is open or closed; and control the display unit to display information corresponding to the predetermined operation of the status indicator in at least part of a screen area of the display unit, the screen area being exposed through the screen window,
    wherein at least part of the screen area is hidden behind the cover.

14. The apparatus of claim 13, wherein the controller is configured to control the status indicator not to be activated while the cover is closed.

15. The apparatus of claim 13, wherein the controller is configured to control the information corresponding to the predetermined operation of the status indicator to be periodically displayed in at least a part of the screen area that is exposed through the screen window while the cover is closed over the electronic device.

16. The apparatus of claim 13, wherein the controller is configured to control the information corresponding to the predetermined operation of the status indicator to be persistently displayed in at least part of the screen area that is exposed through the screen window while the cover is closed over the electronic device.

17. The apparatus of claim 13, wherein the controller is configured to control the display unit to display the information corresponding to the predetermined operation of the status indicator by lighting the entire screen area exposed through the screen window in a color matched to the predetermined operation of the status indicator while the cover is closed over the electronic device.

18. The apparatus of claim 13, wherein the controller is configured to control the display unit to display the information corresponding to the predetermined operation of the status indicator by lighting an edge of the screen area of the display unit.

19. The apparatus of claim 13, wherein the controller is configured to control the display unit to display the information corresponding to the predetermined operation of the status indicator in corresponding text to the predetermined operation of the status indicator in at least part of the screen area that is exposed through the screen window.

20. The apparatus of claim 13, wherein the predetermined operation of the status indicator is indicated in a lighting color, lighting pattern, or a combination of the lighting color and lighting pattern.

21. An apparatus for displaying a status of an electronic device, the apparatus comprising:
 a display unit configured to display; and
 a controller configured to:
  determine whether a cover is open or closed;
  check status information of the electronic device while the cover is closed; and
  control the display unit to display information corresponding to the status information of the electronic device in a lighting color, lighting pattern, or a combination of the lighting color and lighting pattern in at least portion of a screen area of the display unit, the screen area being exposed through a screen window,
 wherein the at least portion of the screen area is hidden behind the cover.

22. The apparatus of claim 21, wherein the controller is configured to control the display unit to display the information corresponding to the status information of the electronic device in at least part of the screen area that is exposed through the screen window while the cover is closed over the electronic device.

23. The apparatus of claim 21, wherein the controller is configured to control the display unit to display the information corresponding to the status information of the electronic device by lighting the entire screen area exposed through the screen window in a color matched to an operation of a status indicator while the cover is closed over the electronic device.

24. The apparatus of claim 21, wherein the controller is configured to control the display unit to display the information corresponding to the status information of the electronic device by lighting an edge of the screen area of the display unit.

25. A non-transitory computer-readable recording medium having a program embodied thereon, that when executed by at least one processor, performs the method of claim 1.

26. A non-transitory computer-readable recording medium having a program embodied thereon, that when executed by at least one processor, performs the method of claim 9.

* * * * *